(12) United States Patent
Lyu et al.

(10) Patent No.: US 11,224,037 B2
(45) Date of Patent: Jan. 11, 2022

(54) DATA TRANSMISSION METHOD, TERMINAL DEVICE, AND NETWORK DEVICE

(71) Applicant: Huawei Technologies Co., Ltd., Shenzhen (CN)

(72) Inventors: Yongxia Lyu, Ottawa-Kanata (CA); Junwei Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 141 days.

(21) Appl. No.: 16/688,074

(22) Filed: Nov. 19, 2019

(65) Prior Publication Data
US 2020/0092863 A1    Mar. 19, 2020

Related U.S. Application Data

(63) Continuation of application No. PCT/CN2018/090445, filed on Jun. 8, 2018.

(30) Foreign Application Priority Data

Jun. 16, 2017 (CN) .......................... 201710461651.4

(51) Int. Cl.
*H04W 72/04* (2009.01)
*H04W 24/08* (2009.01)

(52) U.S. Cl.
CPC ......... *H04W 72/042* (2013.01); *H04W 24/08* (2013.01); *H04W 72/0446* (2013.01); *H04W 72/0453* (2013.01)

(58) Field of Classification Search
CPC ........... H04W 72/042; H04W 72/0446; H04W 72/0453; H04W 24/08
See application file for complete search history.

(56) References Cited

U.S. PATENT DOCUMENTS

| 2011/0280133 A1 | 11/2011 | Chang et al. |
| 2013/0151920 A1 | 6/2013 | Mayrench et al. |

(Continued)

FOREIGN PATENT DOCUMENTS

| CN | 101983489 A | 3/2011 |
| CN | 102333376 A | 1/2012 |

(Continued)

OTHER PUBLICATIONS

China Telecom, "CBG-based transmission with pre-emption indication," 3GPP TSG RAN WG1 Meeting#89, R1-1708379, Hangzhou, China, May 15-29, 2017, 3 pages.

(Continued)

*Primary Examiner* — Melvin C Marcelo
(74) *Attorney, Agent, or Firm* — Slater Matsil, LLP

(57) ABSTRACT

This application provides a data transmission method, a terminal device, and a network device. The method includes: receiving, by a terminal device, first control information sent by a network device, where the first control information is used to instruct the terminal device to receive, on a first time-frequency resource, a first transport block sent by the network device at an $n^{th}$ time; receiving, by the terminal device, the first transport block on the first time-frequency resource; and receiving, by the terminal device, first indication information sent by the network device, where the first indication information is used to indicate a first code block group CBG in the first transport block, and the first CBG corresponds to a second time-frequency resource during $n^{th}$ transmission of the first transport block, where n is an integer greater than or equal to 0.

20 Claims, 11 Drawing Sheets

(56) References Cited

U.S. PATENT DOCUMENTS

| | | | |
|---|---|---|---|
| 2015/0358122 A1 | 12/2015 | Yang et al. | |
| 2016/0173130 A1 | 6/2016 | Krysl et al. | |
| 2018/0270034 A1 | 9/2018 | Sun et al. | |
| 2020/0008216 A1* | 1/2020 | Iyer | H04W 72/1242 |
| 2021/0135791 A1* | 5/2021 | Wang | H04L 1/1812 |

FOREIGN PATENT DOCUMENTS

| | | | |
|---|---|---|---|
| CN | 104160649 A | 11/2014 | |
| CN | 106385709 A | 2/2017 | |
| CN | 106793127 A | 5/2017 | |
| CN | 106817772 A | 6/2017 | |
| CN | 106851846 A | 6/2017 | |
| JP | 2015146600 A | 8/2015 | |
| WO | 2017065548 A1 | 4/2017 | |
| WO | WO-2018228288 A1 * | 12/2018 | H04W 72/0453 |

OTHER PUBLICATIONS

Samsung, "Considerations on signalling design for indicating Pre-empted Resources," 3GPP TSG RAN WG1 Meeting #89, R1-1708037, Hangzhou, China, May 15-19, 2017, 5 pages.

Sequans Communications, "On multiplexing of URLLC and eMBB in DL," 3GPP TSG RAN WG1 Meeting #88bis, R1-1708954, Hangzhou, China, May 15-19, 2017, 6 pages.

* cited by examiner

DATA TRANSMISSION METHOD, TERMINAL DEVICE, AND NETWORK DEVICE

CROSS-REFERENCE TO RELATED APPLICATIONS

This application is a continuation of International Application No. PCT/CN2018/090445, filed on Jun. 8, 2018, which claims priority to Chinese Patent Application No. 201710461651.4, filed on Jun. 16, 2017. The disclosures of the aforementioned applications are hereby incorporated by reference in their entireties.

TECHNICAL FIELD

This application relates to the communications field, and more particularly, to a data transmission method, a terminal device, and a network device in the communications field.

BACKGROUND

Mobile communications technologies have profoundly changed people's life, and people's pursuit of a mobile communications technology having higher performance has never ceased. To cope with explosive growth of mobile data traffic, massive device connections of mobile communication, and continuously emerging various new services and application scenarios in the future, a 5th generation (5G) mobile communications system accordingly emerges. The international telecommunication union (international telecommunication union, ITU) defines three major application scenarios for 5G and future mobile communications systems: enhanced mobile broadband (eMBB), ultra-reliable and low-latency communications (URLLC), and massive machine type communications (mMTC).

Different services have different requirements for the mobile communications system, and the current 5G communications system needs to simultaneously support data transmission requirements for a plurality of different services, for example, a URLLC service and an eMBB service. To improve the system resource utilization, an access network device generally does not reserve a resource for downlink data transmission of the URLLC service due to the burstiness of data of the URLLC service. When the data of the URLLC service arrives at the access network device, if there is no idle time-frequency resource currently, to meet the ultra-short latency requirement of the URLLC service, the access network device cannot wait for scheduling the data of the URLLC service after completing data transmission of the eMBB service scheduled currently. The access network device can allocate a resource to the data of the URLLC service in a preemption manner. The preemption herein means that the access network device selects some or all of allocated time-frequency resources that are used to transmit data of the eMBB service, to transmit the data of the URLLC service, and the access network device does not send the data of the eMBB service on the time-frequency resource used to transmit the data of the URLLC service.

Due to the urgency and importance of the URLLC service, the access network device may select the most appropriate frequency domain resource for the URLLC service, to ensure reliability of the URLLC service. In this case, there may be more than one eMBB user affected by the URLLC service (or more than one eMBB user whose resource is preempted by the URLLC service). Resources of different eMBBs affected by the URLLC service are in different percentages of the total resources allocated by the access network device. Generally, a larger percentage of the affected time-frequency resource indicates a larger decrease of reliability of the affected eMBB transmission relative to reliability that can be achieved by a signal originally intended to be sent. A main reason is that the eMBB user does not know that the time-frequency resource allocated to the eMBB user is allocated for another URLLC transmission and uses data that is not the data of the eMBB user for subsequent demodulation decoding.

Therefore, a technical solution capable of improving reliability of the eMBB service whose resource is preempted by the URLLC service is urgently required.

SUMMARY

This application provides a data transmission method, a terminal device, and a network device, which can improve reliability of transmission of a service whose resource is preempted.

According to a first aspect, a data transmission method is provided. The method includes: receiving, by a terminal device, first control information sent by a network device, where the first control information is used to instruct the terminal device to receive, on a first time-frequency resource, a first transport block sent by the network device at an $n^{th}$ time; receiving, by the terminal device, the first transport block on the first time-frequency resource; and receiving, by the terminal device, first indication information sent by the network device, where the first indication information is used to indicate a first code block group (CBG) in the first transport block, and the first CBG corresponds to a second time-frequency resource during $n^{th}$ transmission of the first transport block, where n is an integer greater than or equal to 0.

The first CBG includes at least one CBG. The first indication information may also be referred to as CGB indication information. In addition, the CBG indication information may be sent by the network device to one terminal device or a group of terminal devices. A CBG indicated by the CBG indication information may be a CBG affected during the $n^{th}$ transmission of the first transport block.

Specifically, a case in which the CBG is affected may be that a time-frequency resource that is indicated by the network device to the terminal device and that is used to send a signal of the first CBG is used to carry another signal instead of the signal in an actual sending process; the time-frequency resource that is indicated by the network device to the terminal device and that is used to send a signal of the first CBG carries neither the signal nor another signal in an actual sending process; or the time-frequency resource that is indicated by the network device to the terminal device and that is used to send a signal of the first CBG carries the signal while signals received by the terminal device on the time-frequency resource also include another signal different from the signal of the first CBG.

In this embodiment of this application, received signals on the second time-frequency resource may include a signal that is not used for the terminal device to decode the first transport block. This may be understood as: The received signals only include the signal that is not used for the terminal device to decode the first transport block, or the received signals not only include the signal that is not used for the terminal device to decode the first transport block, but also include a signal that is used for the terminal device to decode the first transport block.

Herein, the terminal device can partially or completely eliminate signals corresponding to the affected CBG in the signals of the first transport block that are received at an $n^{th}$ time.

Therefore, in this embodiment of this application, the network device sends the first indication information to the terminal device, where the first indication information is used to indicate the first code block group (CBG) in the first transport block, and the first CBG corresponds to the second time-frequency resource during the $n^{th}$ transmission of the first transport block, so that the terminal device can perform subsequent demodulation decoding based on the first indication information, thereby improving the reliability of the transmission of the service whose resource is preempted.

Optionally, the method further includes: receiving, by the terminal device, second indication information sent by the network device, where the second indication information is used to indicate a third time-frequency resource, and an intersection set between the third time-frequency resource and the first time-frequency resource is a fourth time-frequency resource; and determining, by the terminal device, a fifth time-frequency resource based on the first indication information and/or the second indication information, where the fifth time-frequency resource includes at least one resource element (RE), the at least one RE is included in the first time-frequency resource, and received signals on the fifth time-frequency resource include a signal that is not used for the terminal device to decode the first transport block.

The third time-frequency resource is the affected time-frequency resource. The second indication information may be referred to as resource indication information.

Herein, the resource indication information may be sent only to the terminal device, that is, an indication range thereof is a time-frequency resource corresponding to a data channel of the terminal device (that is, the foregoing first time-frequency resource); or the resource indication information may be sent to a group of terminal devices, and the group of terminal devices includes at least the terminal device, that is, an indication range thereof is a predefined time-frequency resource. In the former case, that "the resource indication information indicates the affected time-frequency resource" described below refers to the affected time-frequency resource specifically indicated by the resource indication information, that is, the foregoing fourth time-frequency resource is the foregoing third time-frequency resource. In the latter case, that "the resource indication information indicates the affected time-frequency resource" described below refers to an intersection set between the affected time-frequency resource specifically indicated by the resource indication information and the time-frequency resource corresponding to a data channel or the like of the terminal device, that is, the foregoing fourth time-frequency resource is an intersection set between the third time-frequency resource and the first time-frequency resource.

Optionally, if the first transport block includes only one code block, the fifth time-frequency resource is the fourth time-frequency resource. In this case, a more accurate elimination operation can be provided by eliminating, based on the second indication information, the received signal that is affected.

Optionally, the fifth time-frequency resource is the fourth time-frequency resource. Because a mapping range of the CBG is related to a time-frequency resource that is selected by the network device for the terminal device, a transmission method, a size of a currently transmitted information block, and the like, the mapping range of the CBG is generally irregular. That is, the "affected" time-frequency resource is generally more regular, and the time-frequency resource is usually used to transmit another signal or perform another operation. Therefore, compared with the CBG indication information, the resource indication information generally indicates a more accurate affected range. In other words, if the affected signal is eliminated based only on the CBG indication information, the part that is specifically eliminated is more likely to be greater than the part that is actually affected.

In addition, the elimination operation is simple based only on one type of indication information, and the implementation complexity of the terminal device is reduced.

Alternatively, the fifth time-frequency resource is an intersection set between the second time-frequency resource and the fourth time-frequency resource. A single type of indication information can only use an indication unit as a minimum indication unit (for example, the CBG indication information uses a CBG as an indication unit, and the resource indication information uses a small time frequency unit as an indication unit), and the indication accuracy is limited by a quantity of bits included in a single type of indication information. Therefore, when both types of indication information are available, a more accurate indication range can be obtained based on an intersection set between the two types of indication information. In this way, in this embodiment of this application, the terminal device can more accurately eliminate the affected signal.

Alternatively, the fifth time-frequency resource is the fourth time-frequency resource or the second time-frequency resource that has a smaller quantity of REs. This embodiment of this application can provide more flexibility for the network device. For example, when a relatively small part of a CBG is affected, the network device considers that decoding reliability of the CBG is not affected even if the terminal device does not eliminate the affected part. In this case, the network device can use, based on features of the two types of indication information, one type of indication information as an elimination indication to improve the efficiency and effectiveness of elimination, and then use the other type of indication information as a verification indication to improve indication reliability.

Alternatively, the fifth time-frequency resource includes at least one resource corresponding to one CBG in the first CBG, where the resource is a time-frequency resource that is in a time-frequency resource corresponding to the CBG on the second time-frequency resource and a time-frequency resource corresponding to the CBG on the fourth time-frequency resource and that has a smaller quantity of REs.

In this embodiment of this application, the terminal device can distinguish statuses of the affected CBGs one by one, so that a case in which unnecessary affected signals are excessively eliminated based only on the CBG indication information or the resource indication information is avoided, thereby improving the efficiency and effectiveness of elimination.

In this embodiment of this application, before eliminating the affected signal, the terminal device can verify, by using the received CBG indication information and the received resource indication information, the signal that is to be eliminated. For example, if a time-frequency resource on which the CBG indicated by the CBG indication information is located is within a range indicated by the resource indication information, the terminal device eliminates the affected signal based on the resource indication information.

If the time-frequency resource on which the CBG indicated by the CBG indication information is located is not within the range indicated by the resource indication information, the terminal device can consider that at least one of the two types of indication information has an error, and then determines all currently received signals as the affected signals and eliminates the affected signals. That is, if there is no intersection set between the second time-frequency resource and the fourth time-frequency resource, the fifth time-frequency resource is the first time-frequency resource.

Optionally, the first indication information and the second indication information are within a same time segment in time domain, the time segment includes one or more time units, the time unit is a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

Optionally, if the first indication information precedes the second indication information in time domain, the fifth time-frequency resource is the second time-frequency resource; or if the second indication information precedes the first indication information in time domain, the fifth time-frequency resource is the fourth time-frequency resource.

Optionally, the first indication information and the second indication information are within different time segments in time domain, or the first indication information and the second indication information are within a same time segment in time domain, where the time segment includes one or more time units, the time unit is one of a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

In this embodiment of this application, the fifth time-frequency resource is determined based on the indication information that is relatively preceding in time domain, so that the terminal device can eliminate the affected signal as soon as possible, finish processing (for example, demodulating and decoding) the received signal as soon as possible, and reduce the time interval between the HARQ feedback information and the received signal, thereby reducing the latency on the RAN side of current transmission and improving user experience of the terminal device.

In this embodiment of this application, the terminal device does not use the signal on the fifth time-frequency resource to decode the first transport block. Specifically, if the terminal device determines the fifth time-frequency resource before decoding for the $(n+i)^{th}$ transmission of the first transport block, the terminal device does not use the signal on the fifth time-frequency resource in a decoding process for the $(n+i)^{th}$ transmission and after the $(n+i)^{th}$ transmission of the first transport block, where i is a natural number.

Optionally, after determining the fifth time-frequency resource, the terminal device can also determine a sixth time-frequency resource. If the first indication information precedes the second indication information in time domain, the fifth time-frequency resource is the second time-frequency resource, and the sixth time-frequency resource is the fourth time-frequency resource; or if the second indication information precedes the first indication information in time domain, the fifth time-frequency resource is the fourth time-frequency resource, and the sixth time-frequency resource is the second time-frequency resource. In this case, the method further includes: decoding, by the terminal device, the first transport block without using the signal on the fifth time-frequency resource; and setting, by the terminal device, information that corresponds to the sixth time-frequency resource and that is in a soft buffer to o.

The foregoing example provides scheduling flexibility for the network device, so that the network device can instruct the terminal device to eliminate the affected signal by sending two types of indication information step by step. For example, after sending indication information (the first indication information or the second indication information) indicating a signal that is not used for decoding to the terminal device, the network device determines that the terminal device is likely to fail to receive the indication information (for example, depending on whether the terminal device feeds back a corresponding feedback signal), and the network device may send other indication information (the second indication information or the first indication information) instructing the terminal device to eliminate (set to 0) information that is most likely to be affected in the soft buffer. After sending indication information indicating a signal that is not used for decoding to the terminal device, the network device determines that the terminal device is likely to have received indication information correctly, and the network device may not send the other indication information.

Optionally, the receiving, by the terminal device, first indication information sent by the network device includes: receiving, by the terminal device, second control information sent by the network device, where the second control information includes the first indication information and is further used to instruct the terminal device to receive, on a seventh time-frequency resource, a second CBG in the first transport block sent by the network device at an $(n+k)^{th}$ time, and k is a positive integer.

In a possible implementation of this embodiment of this application, all signals of the CBG indicated by the first indication information are eliminated. Alternatively, in another possible implementation of this embodiment of this application, some or all signals of the CBG are eliminated based on the following indication.

Optionally, the first indication information includes Z bits, where one of the Z bits corresponds to 1/Z of the first time-frequency resource corresponding to all encoded bits of the second CBG; or one indication state of the Z bits corresponds to $1/(2^Z)$ of the first time-frequency resource corresponding to all encoded bits of the second CBG.

Therefore, in this embodiment of this application, a to-be-eliminated part or parts in the CBG can be accurately indicated, thereby avoiding indiscriminately eliminating all received signals of the CBG each time. Therefore, the efficiency of the elimination can be effectively improved, unnecessary transmission waste caused by excessive elimination can be reduced, thereby saving the receiving processing of the terminal device and reducing power consumption. In addition, this embodiment of this application can improve the indication accuracy.

Optionally, the first control information is further used to indicate a first redundancy version of the first CBG in the soft buffer to the terminal device; and the second control information is further used to indicate a second redundancy version of the second CBG in the soft buffer to the terminal device.

Optionally, the method further includes: if encoded bits corresponding to the second redundancy version are included in an encoded bit block of the first CBG sent at an $n^{th}$ time in the soft buffer, the second time-frequency resource being a resource corresponding to the encoded bits that correspond to locations of the first CBG on the first time-frequency resource, where the locations are from the second redundancy version to the encoded bit block of the first CBG sent at the $n^{th}$ time in the soft buffer; or if encoded bits corresponding to the second redundancy version are not included in the encoded bit block of the first CBG sent at the $n^{th}$ time in the soft buffer, the second time-frequency resource being all resources corresponding to the first CBG on the first time-frequency resource.

Therefore, in this embodiment of this application, a case in which all received signals of the CBG are indiscriminately eliminated each time can be avoided without additional indication information. Therefore, the efficiency of the elimination can be effectively improved, unnecessary transmission waste caused by excessive elimination can be reduced, thereby saving the receiving processing of the terminal device and reducing power consumption.

Optionally, the seventh time-frequency resource can carry T encoded bits of the first transport block, and the method further includes: determining, by the terminal device, a quantity of encoded bits of a CB in the second CBG that is carried on the seventh time-frequency resource, where if the first redundancy version is equal to the second redundancy version, the quantity of encoded bits of the CB is equal to a value obtained by rounding T/X; or if the first redundancy version is not equal to the second redundancy version, the quantity of encoded bits of the CB is equal to a value obtained by rounding $S+F(T-Y \times S)/X$ or rounding $(T-Y \times S)/X$, where X is the quantity of CBs in the second CBG, S is the quantity of encoded bits between the first redundancy version and the second redundancy version in the soft buffer, Y is the quantity of CBs in the first CBG, and T, X, S, and Y are all positive integers.

Therefore, in this embodiment of this application, the received signals that are eliminated and that are of the nth transmission can be compensated for the terminal device in the $(n+k)^{th}$ transmission, thereby effectively reducing the impact of the elimination operation on reliability of transmitting the first information block.

According to a second aspect, an embodiment of the present invention provides user equipment, configured to perform the method according to the first aspect or any possible implementation of the first aspect. Specifically, the user equipment includes modules configured to perform the method according to the first aspect or any possible implementation of the first aspect.

According to a third aspect, an embodiment of the present invention provides user equipment. The user equipment includes: a memory, a processor, and a transceiver. The memory is configured to store an instruction, the processor is configured to execute the instruction stored in the memory, and when the processor executes the instruction stored in the memory, the execution enables the processor to perform the method according to the first aspect or any possible implementation of the first aspect.

According to a fourth aspect, an embodiment of the present invention provides a computer-readable medium, configured to store a computer program, and the computer program includes an instruction used to perform the method according to the first aspect or any possible implementation of the first aspect.

According to a first aspect, a data transmission method is provided. The method includes: sending, by a network device, first control information to a terminal device, where the first control information is used to instruct the terminal device to receive, on a first time-frequency resource, a first transport block sent by the network device at an $n^{th}$ time; sending, by the network device, the first transport block to the terminal device on the first time-frequency resource; and sending, by the network device, first indication information to the terminal device, where the first indication information is used to indicate a first code block group (CBG) in the first transport block, and the first CBG corresponds to a second time-frequency resource during $n^{th}$ transmission of the first transport block, where n is an integer greater than or equal to 0.

The first CBG includes at least one CBG. The first indication information may also be referred to as CGB indication information. In addition, the CBG indication information may be sent by the network device to one terminal device or a group of terminal devices. A CBG indicated by the CBG indication information may be a CBG affected during the $n^{th}$ transmission of the first transport block.

Specifically, a case in which the CBG is affected may be that a time-frequency resource that is indicated by the network device to the terminal device and that is used to send a signal of the first CBG is used to carry another signal instead of the signal in an actual sending process; the time-frequency resource that is indicated by the network device to the terminal device and that is used to send a signal of the first CBG carries neither the signal nor another signal in an actual sending process; or the time-frequency resource that is indicated by the network device to the terminal device and that is used to send a signal of the first CBG carries the signal while signals received by the terminal device on the time-frequency resource also include another signal different from the signal of the first CBG.

In this embodiment of this application, received signals on the second time-frequency resource may include a signal that is not used for the terminal device to decode the first transport block. This may be understood as: The received signals only include the signal that is not used for the terminal device to decode the first transport block, or the received signals not only include the signal that is not used for the terminal device to decode the first transport block, but also include a signal that is used for the terminal device to decode the first transport block.

Herein, the terminal device can partially or completely eliminate signals corresponding to the affected CBG in the signals of the first transport block that are received at an $n^{th}$ time.

Therefore, in this embodiment of this application, the network device sends the first indication information to the terminal device, where the first indication information is used to indicate the first code block group (CBG) in the first transport block, and the first CBG corresponds to the second time-frequency resource during the $n^{th}$ transmission of the first transport block, so that the terminal device can perform subsequent demodulation decoding based on the first indication information, thereby improving the reliability of the transmission of the service whose resource is preempted.

Optionally, the method further includes: sending, by the network device, second indication information to the terminal device, where the second indication information is used to indicate a third time-frequency resource, and an intersection set between the third time-frequency resource and the first time-frequency resource is a fourth time-frequency resource; and the first indication information and/or the second indication information is used for the terminal device to determine fifth time-frequency resource, where the fifth time-frequency resource includes at least one resource element (RE), the at least one RE is included in the first time-frequency resource, and received signals on the fifth time-frequency resource include a signal that is not used for the terminal device to decode the first transport block.

The third time-frequency resource is the affected time-frequency resource. The second indication information may be referred to as resource indication information.

Herein, the resource indication information may be sent only to the terminal device, that is, an indication range thereof is a time-frequency resource corresponding to a data channel of the terminal device (that is, the foregoing first time-frequency resource); or the resource indication information may be sent to a group of terminal devices, and the group of terminal devices includes at least the terminal device, that is, an indication range thereof is a predefined time-frequency resource. In the former case, that "the resource indication information indicates the affected time-frequency resource" described below refers to the affected time-frequency resource specifically indicated by the resource indication information, that is, the foregoing fourth time-frequency resource is the foregoing third time-frequency resource. In the latter case, that "the resource indication information indicates the affected time-frequency resource" described below refers to an intersection set between the affected time-frequency resource specifically indicated by the resource indication information and the time-frequency resource corresponding to a data channel or the like of the terminal device, that is, the foregoing fourth time-frequency resource is an intersection set between the third time-frequency resource and the first time-frequency resource.

Optionally, if the first transport block includes only one code block, the fifth time-frequency resource is the fourth time-frequency resource. In this case, a more accurate elimination operation can be provided by eliminating, based on the second indication information, the received signal that is affected.

Optionally, the fifth time-frequency resource is the fourth time-frequency resource. Because a mapping range of the CBG is related to a time-frequency resource that is selected by the network device for the terminal device, a transmission method, a size of a currently transmitted information block, and the like, the mapping range of the CBG is generally irregular. That is, the "affected" time-frequency resource is generally more regular, and the time-frequency resource is usually used to transmit another signal or perform another operation. Therefore, compared with the CBG indication information, the resource indication information generally indicates a more accurate affected range. In other words, if the affected signal is eliminated based only on the CBG indication information, the part that is specifically eliminated is more likely to be greater than the part that is actually affected.

In addition, the elimination operation is simple based only on one type of indication information, and the implementation complexity of the terminal device is reduced.

Alternatively, the fifth time-frequency resource is an intersection set between the second time-frequency resource and the fourth time-frequency resource. A single type of indication information can only use an indication unit as a minimum indication unit (for example, the CBG indication information uses a CBG as an indication unit, and the resource indication information uses a small time frequency unit as an indication unit), and indication accuracy is limited by a quantity of bits included in a single type of indication information. Therefore, when both types of indication information are available, a more accurate indication range can be obtained based on an intersection set between the two types of indication information. In this way, in this embodiment of this application, the terminal device can more accurately eliminate the affected signal.

This embodiment of this application can provide more flexibility for the network device. For example, when a relatively small part of a CBG is affected, the network device considers that the decoding reliability of the CBG is not affected even if the terminal device does not eliminate the affected part. In this case, the network device can use, based on features of the two types of indication information, one type of indication information as an elimination indication to improve the efficiency and effectiveness of elimination, and then use the other type of indication information as a verification indication to improve indication reliability.

Alternatively, the fifth time-frequency resource includes at least one resource corresponding to one CBG in the first CBG, where the resource is a time-frequency resource that is in a time-frequency resource corresponding to the CBG on the second time-frequency resource and a time-frequency resource corresponding to the CBG on the fourth time-frequency resource and that has a smaller quantity of REs.

In this embodiment of this application, the terminal device can distinguish statuses of the affected CBGs one by one, so that a case in which unnecessary affected signals are excessively eliminated based only on the CBG indication information or the resource indication information is avoided, thereby improving the efficiency and effectiveness of elimination.

In this embodiment of this application, before eliminating the affected signal, the terminal device can verify, by using the received CBG indication information and the received resource indication information, the signal that is to be eliminated. For example, if a time-frequency resource on which the CBG indicated by the CBG indication information is located is within a range indicated by the resource indication information, the terminal device eliminates the affected signal based on the resource indication information.

If the time-frequency resource on which the CBG indicated by the CBG indication information is located is not within the range indicated by the resource indication information, the terminal device can consider that at least one of the two types of indication information has an error, and then determines all currently received signals as the affected signals and eliminates the affected signals. That is, if there is no intersection set between the second time-frequency resource and the fourth time-frequency resource, the fifth time-frequency resource is the first time-frequency resource.

Optionally, the first indication information and the second indication information are within a same time segment in time domain, the time segment includes one or more time units, the time unit is a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

Optionally, if the first indication information precedes the second indication information in time domain, the fifth time-frequency resource is the second time-frequency resource; or if the second indication information precedes the first indication information in time domain, the fifth time-frequency resource is the fourth time-frequency resource.

Optionally, the first indication information and the second indication information are within different time segments in time domain, or the first indication information and the second indication information are within a same time segment in time domain, where the time segment includes one or more time units, the time unit is one of a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

Optionally, if there is no intersection set between the second time-frequency resource and the fourth time-frequency resource, the fifth time-frequency resource is the first time-frequency resource.

In this embodiment of this application, the fifth time-frequency resource is determined based on the indication information that is relatively preceding in time domain, so that the terminal device can eliminate the affected signal as soon as possible, finish processing (for example, demodulating and decoding) the received signal as soon as possible, and reduce the time interval between the HARQ feedback information and the received signal, thereby reducing the latency on the RAN side of current transmission and improving user experience of the terminal device.

Optionally, after determining the fifth time-frequency resource, the terminal device can also determine a sixth time-frequency resource. If the first indication information precedes the second indication information in time domain, the fifth time-frequency resource is the second time-frequency resource, and the sixth time-frequency resource is the fourth time-frequency resource; or if the second indication information precedes the first indication information in time domain, the fifth time-frequency resource is the fourth time-frequency resource, and the sixth time-frequency resource is the second time-frequency resource. In this case, the method further includes: decoding, by the terminal device, the first transport block without using the signal on the fifth time-frequency resource; and setting, by the terminal device, information that corresponds to the sixth time-frequency resource and that is in a soft buffer to 0.

The foregoing example provides scheduling flexibility for the network device, so that the network device can instruct the terminal device to eliminate the affected signal by sending two types of indication information step by step. For example, after sending indication information (the first indication information or the second indication information) indicating a signal that is not used for decoding to the terminal device, the network device determines that the terminal device is likely to fail to receive the indication information (for example, depending on whether the terminal device feeds back a corresponding feedback signal), and the network device may send other indication information (the second indication information or the first indication information) instructing the terminal device to eliminate (set to 0) information that is most likely to be affected in the soft buffer. After sending indication information indicating a signal that is not used for decoding to the terminal device, the network device determines that the terminal device is likely to have received indication information correctly, and the network device may not send the other indication information.

Optionally, the network device can also send second control information to the terminal device, where the second control information includes the first indication information and is further used to instruct the terminal device to receive, on a seventh time-frequency resource, a second CBG in the first transport block sent by the network device at an $(n+k)^{th}$ time, and k is a positive integer.

In a possible implementation of this embodiment of this application, all signals of the CBG indicated by the first indication information are eliminated. Alternatively, in another possible implementation of this embodiment of this application, some or all signals of the CBG are eliminated based on the following indication.

Optionally, the first indication information includes Z bits, where one of the Z bits corresponds to 1/Z of the first time-frequency resource corresponding to all encoded bits of the second CBG; or one indication state of the Z bits corresponds to $1/(2^Z)$ of the first time-frequency resource corresponding to all encoded bits of the second CBG.

Therefore, in this embodiment of this application, a to-be-eliminated part or parts in the CBG can be accurately indicated, thereby avoiding indiscriminately eliminating all received signals of the CBG each time. Therefore, the efficiency of the elimination can be effectively improved, unnecessary transmission waste caused by excessive elimination can be reduced, thereby saving the receiving processing of the terminal device and reducing power consumption. In addition, this embodiment of this application can improve the indication accuracy.

Optionally, the first control information is further used to indicate a first redundancy version of the first CBG in the soft buffer to the terminal device; and the second control information is further used to indicate a second redundancy version of the second CBG in the soft buffer to the terminal device.

Optionally, the method further includes: if encoded bits corresponding to the second redundancy version are included in an encoded bit block of the first CBG sent at an $n^{th}$ time in the soft buffer, the second time-frequency resource being a resource corresponding to the encoded bits that correspond to locations of the first CBG on the first time-frequency resource, where the locations are from the second redundancy version to the encoded bit block of the first CBG sent at the $n^{th}$ time in the soft buffer; or if encoded bits corresponding to the second redundancy version are not included in the encoded bit block of the first CBG sent at the $n^{th}$ time in the soft buffer, the second time-frequency resource being all resources corresponding to the first CBG on the first time-frequency resource.

Therefore, in this embodiment of this application, a case in which all received signals of the CBG are indiscriminately eliminated each time can be avoided without additional indication information. Therefore, the efficiency of the elimination can be effectively improved, unnecessary transmission waste caused by excessive elimination can be reduced, thereby saving the receiving processing of the terminal device and reducing power consumption.

According to a sixth aspect, an embodiment of the present invention provides a network device, configured to perform the method according to the fifth aspect or any possible implementation of the fifth aspect. Specifically, the user equipment includes modules configured to perform the method according to the fifth aspect or any possible implementation of the fifth aspect.

According to a seventh aspect, an embodiment of the present invention provides a network device. The network device includes: a memory, a processor, and a transceiver. The memory is configured to store an instruction, the processor is configured to execute the instruction stored in the memory, and when the processor executes the instruction stored in the memory, the execution enables the processor to perform the method according to the fifth aspect or any possible implementation of the fifth aspect.

According to an eighth aspect, an embodiment of the present invention provides a computer-readable medium, configured to store a computer program, and the computer program includes an instruction used to perform the method according to the fifth aspect or any possible implementation of the fifth aspect.

DETAILED DESCRIPTION OF ILLUSTRATIVE EMBODIMENTS

Figure 1:
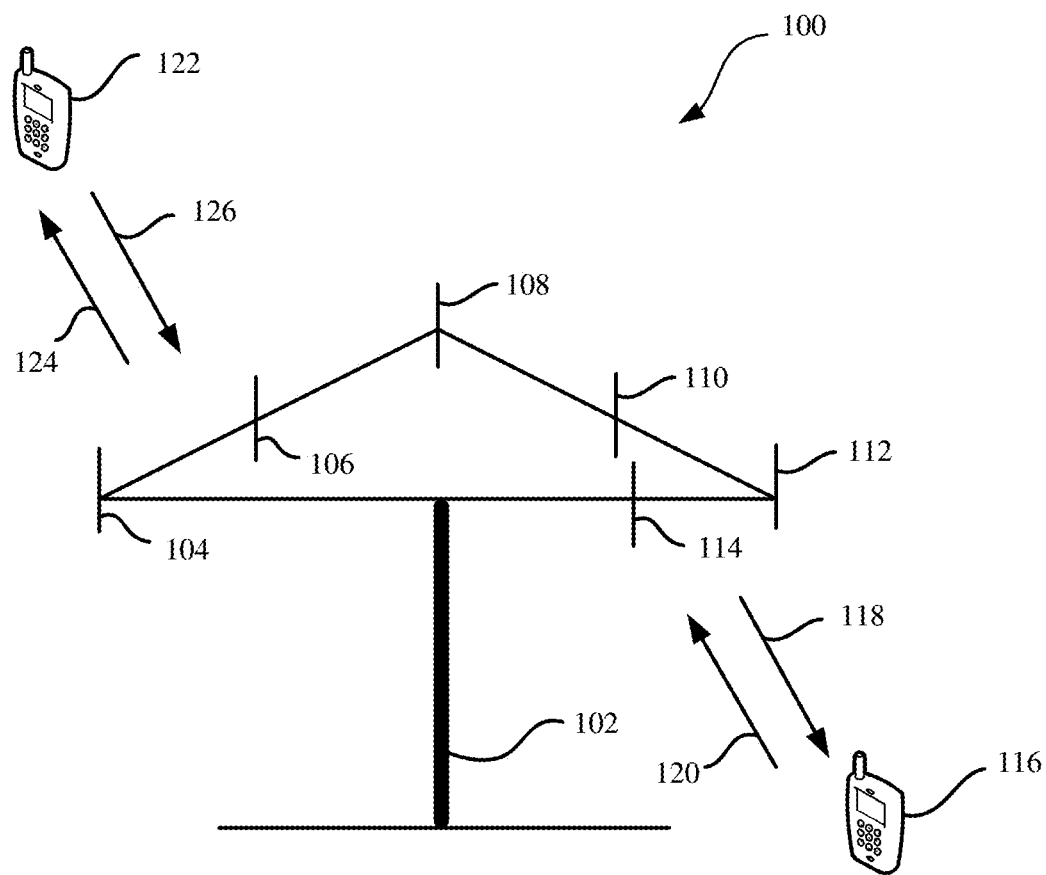
FIG. 1 is a schematic diagram of a wireless communications system according to an embodiment of the present invention.

The following describes technical solutions of this application with reference to accompanying drawings.

It should be understood that the embodiments of the present invention may be applied to various communications systems, such as: a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunications system (UMTS), and a next-generation communications system such as a 5G system.

Usually, a connection quantity supported by a conventional communications system is limited, and is easy to implement. However, with development of communications technologies, a mobile communications system not only supports conventional communication, but also supports device-to-device (D2D) communication, machine-to-machine (M2M) communication, machine type communication (MTC), vehicle-to-vehicle (V2V) communication, and the like.

In the embodiments of this application, the embodiments are described with reference to a sending device and a receiving device. The sending device may be one party of a network device and a terminal device, and the receiving device may be the other party of the network device and the terminal device. For example, in the embodiments of this application, the sending device may be the network device, and the receiving device may be the terminal device; or the sending device may be the terminal device, and the receiving device may be the network device.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (station, STA) in a wireless local area network (WLAN), a cellular phone, a cordless phone, a session initiation protocol (SIP) phone, a wireless local loop (WLL) station, a personal digital assistant (PDA) device, a handheld device or a computing device having a wireless communication function, another processing device, vehicle-mounted device, or wearable device connected to a wireless modem, or a next-generation communications system, for example, a terminal device in a 5th generation (5G) communications network or a terminal device in a future evolved public land mobile network (PLMN).

In an example, in the embodiments of the present invention, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device not only is a hardware device, but also implements a powerful function through software support, a data exchange, and cloud interaction. Generalized wearable intelligent devices include full-featured and large-size devices, such as a smartwatch or smart glasses, that can implement a complete or partial function without depending on a smartphone, and devices, such as various smart bands or smart jewelry for vital sign monitoring, that focus on only one type of application function and need to work with another device such as a smartphone.

The network device may be a device configured to communicate with a mobile device. The network device may be an access point (AP) in a WLAN, or a base transceiver station (BTS) in GSM or CDMA, or may be a NodeB (NB) in WCDMA, or further may be an evolved Node B (eNB or eNodeB) in LTE, or a regeneration station or an access point, or a vehicle-mounted device, a wearable device, a network device in a future 5G network, a network device in a future evolved PLMN network, or the like.

In addition, in the embodiments of this application, the network device provides a service to a cell, and the terminal device communicates with the network device on a transmission resource (such as a frequency domain resource or a spectrum resource) used by the cell. The cell may be a cell corresponding to the network device (such as a base station). The cell may be served by a macro base station, or may be served by a base station corresponding to a small cell (small cell). Herein, the small cell may include: a metro cell, a micro cell, a pico cell, a femto cell, and the like. These small cells have characteristics of small coverage and low transmit power, and are applicable to provide a high-speed data transmission service.

The method and apparatus provided in the embodiments of this application may be applied to the terminal device or the network device. The terminal device or the network device includes a hardware layer, an operating system layer run above the hardware layer, and an application layer run above the operating system layer. The hardware layer includes hardware such as a central processing unit (CPU), a memory management unit (MMU), and an internal memory (also referred to as a main memory). The operating system may be any one or more types of computer operating systems, for example, a Linux operating system, a Unix operating system, an Android operating system, an iOS operating system, and a Windows operating system, that implement service processing by using a process. The application layer includes applications such as a browser, an address book, word processing software, and instant messaging software. In addition, in the embodiments of the present invention, a specific structure of an execution body of the signal transmission method is not particularly limited, provided that communication can be performed according to the signal transmission method in the embodiments of the present invention by running a program in which code of the signal transmission method in the embodiments of the present invention is recorded. For example, the execution body of the wireless communication method of the embodiments of the present invention may be a terminal device or a network device, or a functional module that is in the terminal device or the network device and that can call a program and execute the program.

In addition, aspects or features in the embodiments of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

In the current discussion, one consensus is that a mini-slot concept may be applied to a scenario of large bandwidth scheduling in a high frequency system, that is, a scheduling policy tilts towards a relatively small time granularity. However, for how to perform data scheduling based on a mini-slot, there is no determined solution. In addition, for how to listen on a downlink control channel based on the mini-slot, there is also no determined solution.

For the foregoing problems, the embodiments of this application provide a data sending method and a data receiving method, and a corresponding network device and terminal device.

FIG. 1 is a schematic diagram of a wireless communications system according to an embodiment of the present invention. As shown in FIG. 1, the wireless communications system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, and an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or the terminal device 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100.

As shown in FIG. 1, the terminal device 116 communicates with the antennas 112 and 114. The antennas 112 and 114 send information to the terminal device 116 over a forward link (also referred to as a downlink link) 118, and receive information from the terminal device 116 over a reverse link (also referred to as an uplink link) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system, a full duplex system, and a flexible duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the network device 102. For example, an antenna group may be designed to communicate with a terminal device in the sector within coverage of the network device 102. The network device may send, by using a single antenna or a plurality of antenna transmit diversities, a signal to all terminal devices in a sector corresponding to the network device. In a process in which the network device 102 communicates with the terminal devices 116 and 122 over the forward links 118 and 124 respectively, a transmit antenna of the network device 102 may improve signal-to-noise ratios of the forward links 118 and 124 through beamforming. In addition, compared with a manner in which the network device sends a signal to all terminal devices served by the network device by using a single antenna or a plurality of antenna transmit diversities, when the network device 102 sends, through beamforming, a signal to the terminal devices 116 and 122 that are randomly distributed within related coverage, less interference is caused to a mobile device in a neighboring cell.

In a given time, the network device 102 and the terminal device 116 or the terminal device 122 may be a sending apparatus for wireless communication and/or a receiving apparatus for wireless communication. When sending data, the sending apparatus for wireless communication may encode the data for transmission. Specifically, the sending apparatus for wireless communication may obtain (for example, generate, receive from another communications apparatus, or store in a memory) a particular quantity of data bits to be sent, by using a channel, to the receiving apparatus for wireless communication. The data bit may be included in a transport block (or a plurality of transport blocks) of the data, and the transport block may be segmented to produce a plurality of code blocks.

In addition, the communications system 100 may be a PLMN network, a D2D network, an M2M network, or another network. FIG. 1 is only an example of a simplified schematic diagram, and a network may further include another network device that is not drawn in FIG. 1.

The URLLC services have a very high requirement on a latency, and require a transmission latency to be not longer than 0.5 millisecond (ms) when reliability is not considered; and require the transmission latency to be not longer than 1 ms when 99.999% reliability is reached.

In a long term evolution (LTE) system, a minimum time scheduling unit is a transmission time interval (TTI) of a time length of 1 ms. To meet the transmission latency requirement of the URLLC service, the data transmission of a wireless air interface can use a shorter time scheduling unit. For example, a mini-slot or a slot with a larger subcarrier spacing is used as the minimum time scheduling unit. One mini-slot includes one or more time domain symbols, and the time domain symbols herein may be orthogonal frequency division multiplexing (OFDM) symbols. A slot with a subcarrier spacing of 15 kilohertz (kHz) includes 6 or 7 time domain symbols, and corresponds to a time length of 0.5 ms. A time length corresponding to a slot with a subcarrier spacing of 60 kHz is shortened to 0.125 ms.

The generation of packets of the URLLC service is bursty and random, and no packet may be generated within a long period of time, or a plurality of packets may be generated within a short period of time. In most cases, the packets of the URLLC service are small packets, for example, 50 bytes.

The features of the packets of the URLLC service affect resource allocation manners of the communications system. The resource herein includes but is not limited to a time domain symbol, a frequency domain resource, a time-frequency resource, a code word resource, a wave beam resource, and the like. Generally, system resources are allocated by the access network device, and the following is described by using the access network device as an example. If the access network device allocates resources for the URLLC service by reserving resources, the system resources are wasted when there is no URLLC service. In addition, the short latency feature of the URLLC service requires that the packets are transmitted in a very short time. Therefore, the access network device needs to reserve enough bandwidth for the URLLC service, so that the system resource utilization is seriously reduced.

Because the eMBB service has a larger amount of data and a higher transmission rate, a longer time scheduling unit is generally used for data transmission, to improve transmission efficiency. For example, a slot with a subcarrier spacing of 15 kHz corresponds to 7 time domain symbols, and corresponds to a time length of 0.5 ms. The data of the URLLC service generally uses shorter time scheduling units, to meet the ultra-short latency requirement. For example, 2 time domain symbols with a subcarrier spacing of 15 kHz or a slot with a subcarrier spacing of 60 kHz corresponds to 7 time domain symbols, and corresponds to a time length of 0.125 ms.

Figure 2:
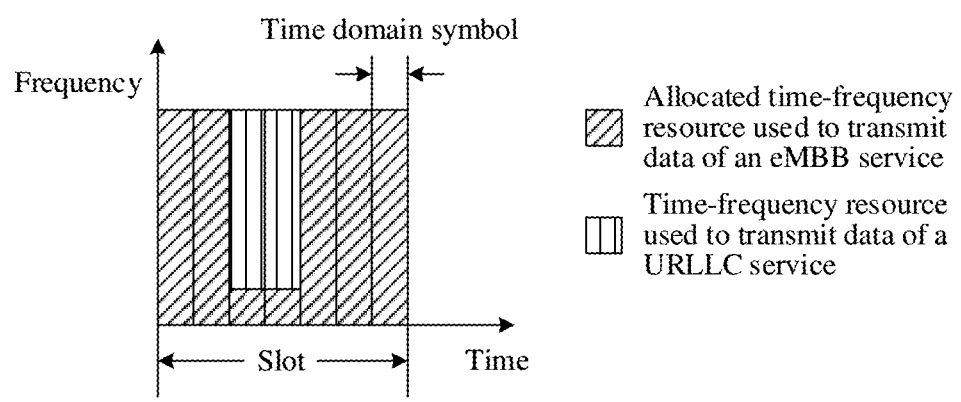
FIG. 2 is a schematic diagram of a time-frequency resource that is used to transmit data of an eMBB service and that is preempted by data of a URLLC service.

To improve the system resource utilization, an access network device generally does not reserve a resource for downlink data transmission of the URLLC service due to the burstiness of data of the URLLC service. When the data of the URLLC service arrives at the access network device, if there is no idle time-frequency resource currently, to meet the ultra-short latency requirement of the URLLC service, the access network device cannot wait for scheduling the data of the URLLC service after completing data transmission of the eMBB service scheduled currently. The access network device can allocate a resource to the data of the URLLC service in a preemption manner. FIG. 2 is a schematic diagram of a time-frequency resource that is used to transmit data of an eMBB service and that is preempted by data of an URLLC service. The preemption herein means that the access network device selects some or all of allocated time-frequency resources that are used to transmit data of the eMBB service, to transmit the data of the URLLC service, and the access network device does not send the data of the eMBB service on the time-frequency resource used to transmit the data of the URLLC service.

Further, due to the urgency and importance of the URLLC service, the access network device may select the most appropriate frequency domain resource for the URLLC service to ensure reliability of the URLLC service. In this case, there may be more than one eMBB user affected by the URLLC service (or more than one eMBB user whose resource is preempted by the URLLC service). Resources of different eMBBs affected by the URLLC service are in different percentages of the total resources allocated by the access network device. Generally, a larger percentage of the affected time-frequency resource indicates a larger decrease of reliability of the affected eMBB transmission relative to reliability that can be achieved by a signal originally intended to be sent. A main reason is that the eMBB user does not know that the time-frequency resource allocated to the eMBB user is allocated for another URLLC transmission and uses data that is not the data of the eMBB user for subsequent demodulation decoding.

Figure 3:
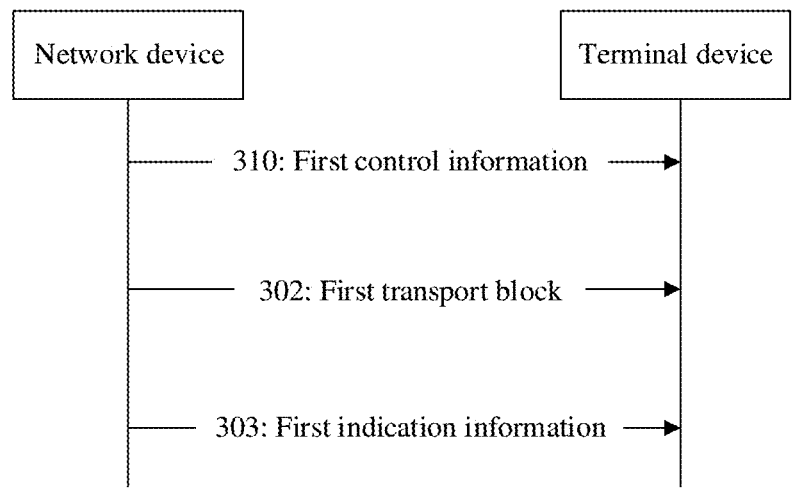
FIG. 3 is a schematic interaction flowchart of a data transmission method according to an embodiment of the present invention.

FIG. 3 is a schematic interaction flowchart of a data transmission method according to an embodiment of the present invention.

310: A network device sends first control information to a terminal device, where the first control information is used to instruct the terminal device to receive, on a first time-frequency resource, a first transport block sent by the network device at an $n^{th}$ time.

When the network device schedules the terminal device to perform physical layer data transmission, one or more information blocks are actually transmitted. The one information block may be one transport block, or may be one code block or one code block group. One transport block includes several information bits. The transport block is divided into one or more code blocks based on the quantity of information bits. The information bits in the code block are channel coded once to generate channel coded bits. One code block group includes at least one code block. Herein, if $n^{th}$ transmission includes at least one code block of a first information block, the transmission may be referred to as transmission related to the first information block.

In this embodiment of this application, a resource includes one or more frequency domain units in frequency domain. The frequency domain unit may include one or more resource blocks, and may also include one or more resource block groups. The resource includes one or more time units in time domain. The time unit may include one or more time domain symbols, one or more slots, one or more mini-slots, or one or more subframes. The frequency domain unit includes a plurality of frequency domain units, and the plurality of the frequency domain unit may be continuous, or may be non-continuous. This is not limited in this application. The time unit includes a plurality of time units, and the plurality of time units may be continuous, or may be non-continuous. This is not limited in this application. The time domain symbols may be orthogonal frequency division multiplexing (OFDM) symbols, or may be single-carrier frequency division multiplexing (SC-FDM) symbols. It should be understood that the symbol may include a cyclic prefix corresponding to the symbol.

Figure 4:
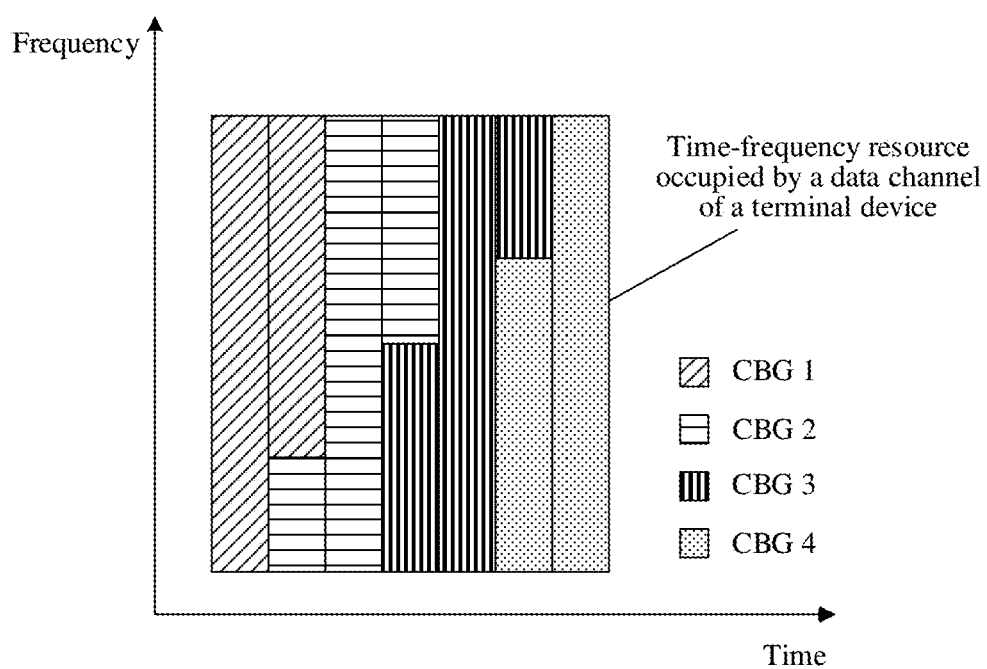
FIG. 4 is a schematic diagram of a correspondence between a CBG and a time-frequency resource according to an embodiment of this application.

In this embodiment of this application, n is an integer greater than or equal to 0. In a 5G NR system, retransmission based on a CB group (CBG) may be indicated. That is, a complete TB is transmitted during initial transmission (that is, the $(n=0)^{th}$ transmission), and the network device may only schedule the CBGs with transmission errors during the retransmission (that is, $(n>0)^{th}$ or transmission). Herein, one TB includes at least one CBG, and one CBG includes at least one CB. FIG. 4 is a schematic diagram of a mapping relationship between CBGs and a time-frequency resource according to an embodiment of this application. Specifically, FIG. 4 shows how a CBG 1, a CBG 2, a CBG 3 and a CBG 4 are mapped onto an allocated time-frequency resource during one transmission.

320: The terminal device receives the first transport block on the first time-frequency resource.

Specifically, the terminal device can receive the first transport block on the first time-frequency resource based on the first control information.

33_o_: The terminal device receives first indication information sent by the network device, where the first indication information is used to indicate a first code block group (CBG) in the first transport block, and the first CBG corresponds to a second time-frequency resource during $n^{th}$ transmission of the first transport block.

The first CBG includes at least one CBG. The first indication information may also be referred to as CGB indication information. In addition, the CBG indication information may be sent by the network device to one terminal device or a group of terminal devices.

In this embodiment of this application, a CBG indicated by the CBG indication information may be a CBG affected during the $n^{th}$ transmission of the first transport block. In other words, the CBG indication information may be used to indicate affected code blocks CB or code block groups CBG received by the terminal device. Generally, one or more TBs (that is, the first transport block), for example, 1 or 2 TBs, are sent or received during one transmission of the terminal device. The CBG indication information may indicate a CBG included in a transmission signal of the $n^{th}$ transmission of the first transport block.

The CBG indication information may use a bitmap method. For example, the first transport block includes S CBGs, and the CBG indication information may include S bits corresponding to the S CBGs. Alternatively, the CBG indication information includes L bits corresponding to L CBGs in the S CBGs scheduled by the network device during the $n^{th}$ transmission of the first transport block. The CBG indication information may also indicate by using M states of an N-bit field (N and M are positive integers, and M is less than or equal to $2^N$), and the meaning of each state is preset in the network device and/or the terminal device.

In this embodiment of this application, the "affected" may refer to at least one of the following cases:

Case 1: In an actual sending process, a time-frequency resource that is indicated by the network device to the terminal device and that is used to send a signal of the first CBG (for example, a resource element (RE)) is used to carry another signal instead of the signal.

Case 2: In an actual sending process, the time-frequency resource that is indicated by the network device to the terminal device and that is used to send a signal of the first CBG carries neither the signal nor another signal. Specifically, after indicating to the terminal device that the resource is used to carry the signal of the first CBG, the network device determines to make the resource vacant or to send no signal on the resource, and uses the resource to achieve another objective. For example, the network device uses the resource to measure interference from a neighboring cell.

Case 3: In an actual sending process, the time-frequency resource that is indicated by the network device to the terminal device and that is used to send a signal of the first CBG carries the signal while signals received by the terminal device on the time-frequency resource also include another signal different from the signal of the first CBG.

Herein, the "another signal" may be a signal sent by the same network. For example, the network device sends the signal of the first CBG and "another signal" in a superposition manner. The "sending the signal in a superposition manner" may be that a sending device sends a signal A while sending a signal B on the same time-frequency resource. The sending device can use different signal features to send the signal A and the signal B, so that a receiving device can distinguish the signal A from the signal B. For example, the sending device uses different modulation mapping modes or different waveforms to send the signal A and the signal B.

Alternatively, the "another signal" may also be sent by other sending devices than the "network device".

A possible case is that the "another signal" may be a type of interference to the terminal device. That is, in the signals received from the time-frequency resource carrying the signal of the first CBG, the signal of the first CBG is a wanted signal expected by the terminal device, and the "another signal" is an interference signal. When the interference signal is a strong interference signal, the network device can send indication information to the terminal device, to indicate that the signal that is of the first CBG and that is received by the terminal device on the time-frequency resource is affected by the interference, to indicate that the signal that is of the first CBG and that is received by the terminal device on the time-frequency resource is unreliable, or to indicate that the signal that is of the first CBG and that is received by the terminal device on the time-frequency resource has lower reception reliability.

In this embodiment of this application, received signals on the second time-frequency resource may include a signal that is not used for the terminal device to decode the first transport block. This may be understood as: The received signals only include the signal that is not used for the terminal device to decode the first transport block, or the received signals not only include the signal that is not used for the terminal device to decode the first transport block, but also include a signal that is used for the terminal device to decode the first transport block.

Herein, the terminal device can partially or completely eliminate (eliminate) signals corresponding to the affected CBG in the signals of the first transport block that are received at an $n^{th}$ time. Specifically, the CBG indication information may directly indicate CBGs that are to be eliminated, or may enable the terminal device to determine CBGs that need to be eliminated by indicating CBGs that are not to be eliminated.

The signal eliminated by the terminal device may specifically be a pre-modulated time frequency signal. In other words, the signal that is to be eliminated may be not used for decoding. For example, the terminal device discards the pre-modulated signal that is to be eliminated without further processing (for example, demodulation), and the confidence (soft information) of the bit corresponding thereto is set to o. Alternatively, the terminal device eliminates, before decoding, the signal that is to be eliminated, that is, the confidence (soft information) of the bit corresponding to the signal that is to be eliminated is set to o. Therefore, the elimination may also refer to discarding, dropping, obliterating, removing, setting to o (set to be zero), and the like. This is not limited in the present invention.

Specifically, the terminal device may not perform decoding based on the affected signal. Further, the terminal device may not generate a corresponding acknowledgement/non-acknowledgement (ACK/NACK) feedback signal based on the affected signal. For example, the terminal device may set soft bit information corresponding to the signal that is to be eliminated to o in a soft buffer; the terminal device does not write information corresponding to the signal that is to be eliminated into the soft buffer; the terminal device does not use, during demodulation, a modulated symbol that is in the signal and that corresponds to the signal that is to be eliminated (performs processing as if no modulated symbol is received); the terminal device does not receive the signal that is to be eliminated; or the terminal device discards a time domain received signal, the modulated symbol, or the bit information that corresponds to the signal that is to be eliminated.

It should be understood that, if the signal is affected, the signal needs to be eliminated, but in the actual elimination process, the eliminated signal is not necessarily the affected signal.

It should be noted that the present invention uses preempting an eMBB transmission resource by URLLC as an example, but the present invention is not limited thereto. For example, the user preempting the resources may also be an eMBB user with a high priority. An URLLC user with a low priority may also be preempted by a user with a high priority. Another type of user in the network may also be a preemptor or a preemptee. The preempted resources may be used to send data or control information, or may be left blank (for example, to avoid interference to another signal or to avoid interference). For another example, application background of the present invention may not be resource preemption, but a case in which the transmitted signal is subject to uneven strong interference and some resources of current transmission are subject to strong interference. In this case, the network device instructs, by using the indication information, the terminal device affected by the interference to eliminate the signal received on the time-frequency resource on which the interference is located.

Therefore, in this embodiment of this application, the network device sends the first indication information to the terminal device, where the first indication information is used to indicate the first code block group (CBG) in the first transport block, and the first CBG corresponds to the second time-frequency resource during the $n^{th}$ transmission of the first transport block, so that the terminal device can perform subsequent demodulation decoding based on the first indication information, thereby improving reliability of the transmission of the service whose resource is preempted.

Optionally, the terminal device may alternatively receive second indication information sent by the network device. The second indication information is used to indicate a third time-frequency resource, and an intersection set between the third time-frequency resource and the first time-frequency resource is a fourth time-frequency resource.

The terminal device determines a fifth time-frequency resource. The fifth time-frequency resource includes at least one resource element (RE), the at least one RE is included in the first time-frequency resource, and received signals on the fifth time-frequency resource include a signal that is not used for the terminal device to decode the first transport block.

Specifically, in this embodiment of this application, the network device may alternatively send the second indication information to the terminal device. The second indication information is used to indicate the third time-frequency resource, and the third time-frequency resource is an affected time-frequency resource. Herein, the third time-frequency resource at least partially overlaps with the first time-frequency resource, and an overlapping part (that is, an intersection set) between the third time-frequency resource and the first time-frequency resource is the fourth time-frequency resource. In addition, the second indication information may be resource indication information or preemption indication information. The present invention is not limited thereto.

Figure 5:
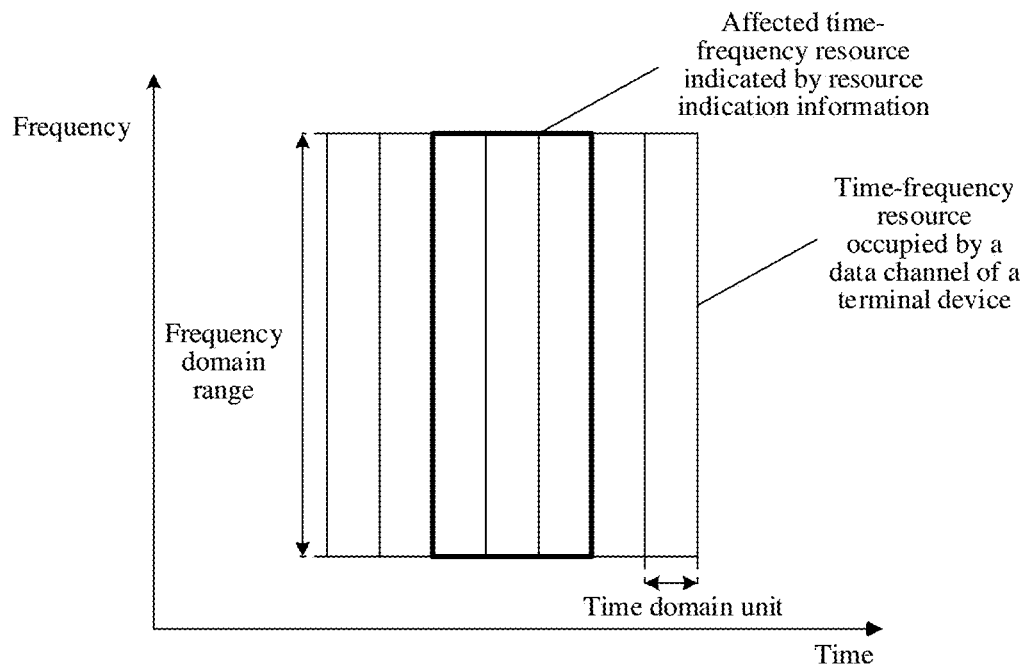
FIG. 5 is a schematic diagram of an affected time-frequency resource indicated by resource indication information according to an embodiment of this application.

The resource indication information can indicate affected time-frequency resources within a time-frequency resource (the time-frequency resource occupies a certain frequency domain range and corresponds to duration in time domain). FIG. 5 is a schematic diagram of an affected time-frequency resource indicated by resource indication information according to an embodiment of this application. Specifically, the time-frequency resource indicated by the resource indication information in FIG. 5 occupies a frequency domain range marked in the figure, including 7 time units in time domain. The resource indication information indicates that a time-frequency resource marked by a black thick frame in the time-frequency resource is an affected time-frequency resource.

Herein, the resource indication information may be sent only to the terminal device, that is, an indication range thereof is a time-frequency resource corresponding to a data channel of the terminal device (that is, the foregoing first time-frequency resource); or the resource indication information may be sent to a group of terminal devices, and the group of terminal devices includes at least the terminal device, that is, an indication range thereof is a predefined time-frequency resource. In the former case, that "the resource indication information indicates the affected time-frequency resource" described below refers to the affected time-frequency resource specifically indicated by the resource indication information, that is, the foregoing fourth time-frequency resource is the foregoing third time-frequency resource. In the latter case, that "the resource indication information indicates the affected time-frequency resource" described below refers to an intersection set between the affected time-frequency resource specifically indicated by the resource indication information and the time-frequency resource corresponding to a data channel or the like of the terminal device, that is, the foregoing fourth time-frequency resource is an intersection set between the third time-frequency resource and the first time-frequency resource.

Because both the network device and the terminal device know the location of "one time-frequency resource" indicated by the resource indication information in frequency domain and time domain, the terminal device can learn whether the terminal device receives the signal on the "one time-frequency resource", and then compares whether the time-frequency resource occupied by the signal of the terminal device is overlapped with the affected time-frequency resource notified by the access network device, to determine whether a received signal is affected or not. If the overlapping occurs, a received signal corresponding to an overlapping part is affected.

The resource indication information may use a bitmap indication method. That is, the time-frequency resource is divided into a plurality of copies, each bit represents one of the copies, and a state 1 of the bit indicates that the corresponding time-frequency resource is affected, or a state 0 of the bit indicates that the corresponding time-frequency resource is affected. The present invention is not limited thereto. The resource indication information may also indicate by using M states of an N-bit field (N and M are positive integers, and M is less than or equal to $2^N$), and the meaning of each state is preset in the terminal device and/or the network device.

In addition, in this embodiment of this application, the resource indication information can indicate time-frequency resources in one time-frequency resource that are affected or time-frequency resources in one time-frequency resource that are not affected. The present invention is not limited thereto.

It should be noted that the terminal device can receive the resource indication information, the CBG indication information, or both the resource indication information and the CBG indication information. Specifically, the network device may send two types of indication information, and the terminal device receives indication information. For example, the terminal device itself determines a type of indication information to receive, or the network device configures how to receive the indication information. Alternatively, the network device may only send indication information, and the corresponding terminal device receives the sent indication information.

In a possible implementation of this embodiment of this application, it is assumed that the network device sends two types of indication information, and the terminal device receives the two types of indication information (where the sending and receiving are self-behavior, or the sending is configured by the network device, or the receiving is specified by a rule preset in the terminal device). The following describes in detail how the terminal device "eliminates the affected signal" based on the two types of indication information.

Specifically, in this embodiment of this application, the terminal device determines the fifth time-frequency resource based on the first indication information and/or the second indication information. In this embodiment of this application, a received signal on the fifth time-frequency resource may be a signal finally eliminated by the terminal.

In an example, if the first transport block includes only one code block group, the fifth time-frequency resource is the fourth time-frequency resource.

Specifically, when the first transport block includes only one code block group, the CBG indicated by the first indication information is the CBG included in the first transport block. Therefore, when receiving the second indication information and determining that the first transport block includes only one code block group, the terminal device can eliminate, based on the time-frequency resource indicated by the second indication information, the received signal that is affected. In this case, the fifth time-frequency resource is the fourth time-frequency resource.

In this case, a more accurate elimination operation can be provided by eliminating, based on the second indication information, the received signal that is affected.

In the following embodiment, the first transport block may include at least two code block groups. The following describes how to determine the fifth time-frequency resource when the first transport block includes at least two code block groups with reference to specific embodiments. It should be noted that the data channel of the terminal device shown in FIG. 6 to FIG. 10 below occupies the same time-frequency resource in FIG. 4, and the CBG 1 to the CBG 4 are not shown in FIG. 6 to FIG. 10, to illustrate the affected time-frequency resource and the eliminated time-frequency resource more clearly, but this is not limited in the embodiments of this application.

In another example, the fifth time-frequency resource is the fourth time-frequency resource.

Figure 6:
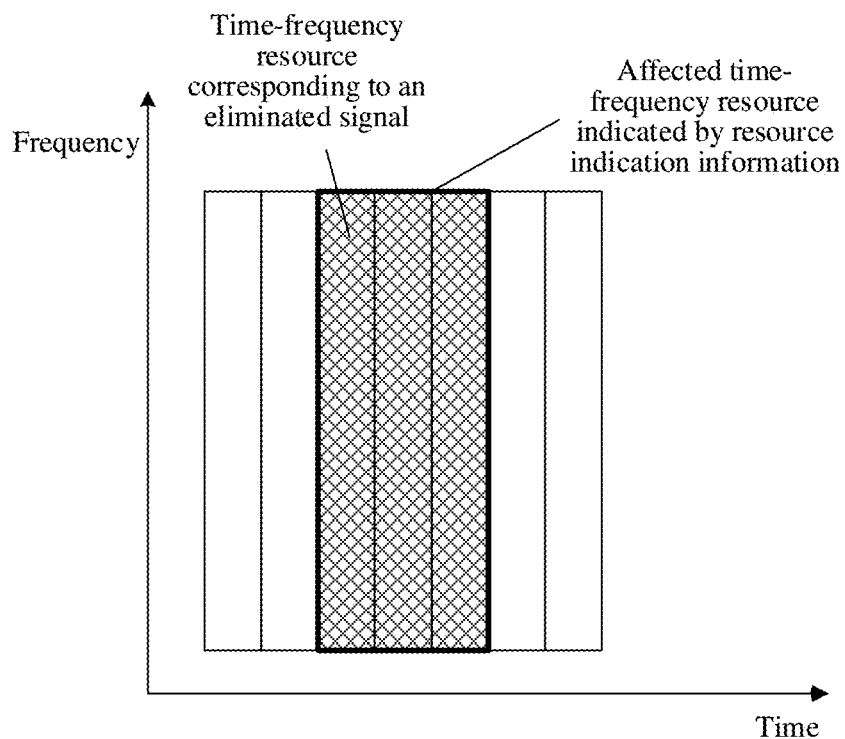
FIG. 6 is a schematic diagram of an affected CBG and an affected time-frequency resource according to an embodiment of this application.

FIG. 6 is a schematic diagram of an affected CBG and an affected time-frequency resource according to an embodiment of this application. A black frame in FIG. 6 marks an affected time-frequency resource that is indicated by resource indication information and that is in a time-frequency resource corresponding to a signal received by the terminal device. In addition, CBG indication information indicates that the CBG 2 and the CBG 3 are affected. The terminal device first eliminates the affected signal based on the received resource indication information, and the shading range in the figure is a time-frequency resource corresponding to the affected signal that is eliminated.

Because a mapping range of the CBG is related to a time-frequency resource that is selected by the network device for the terminal device, a transmission method, a size of a currently transmitted information block, and the like, the mapping range of the CBG is generally irregular. Referring to the foregoing description, the "affected" time-frequency resource is generally more regular, and the time-frequency resource is usually used to transmit another signal or perform another operation. Therefore, compared with the CBG indication information, the resource indication information generally indicates a more accurate affected range. In other words, if the affected signal is eliminated based only on the CBG indication information, the part that is specifically eliminated is more likely to be greater than the part that is actually affected.

In addition, the elimination operation is simple based only on one type of indication information, and the implementation complexity of the terminal device is reduced.

In another example, the terminal device can determine the fourth time-frequency resource based on the first indication information and the second indication information.

Figure 7:
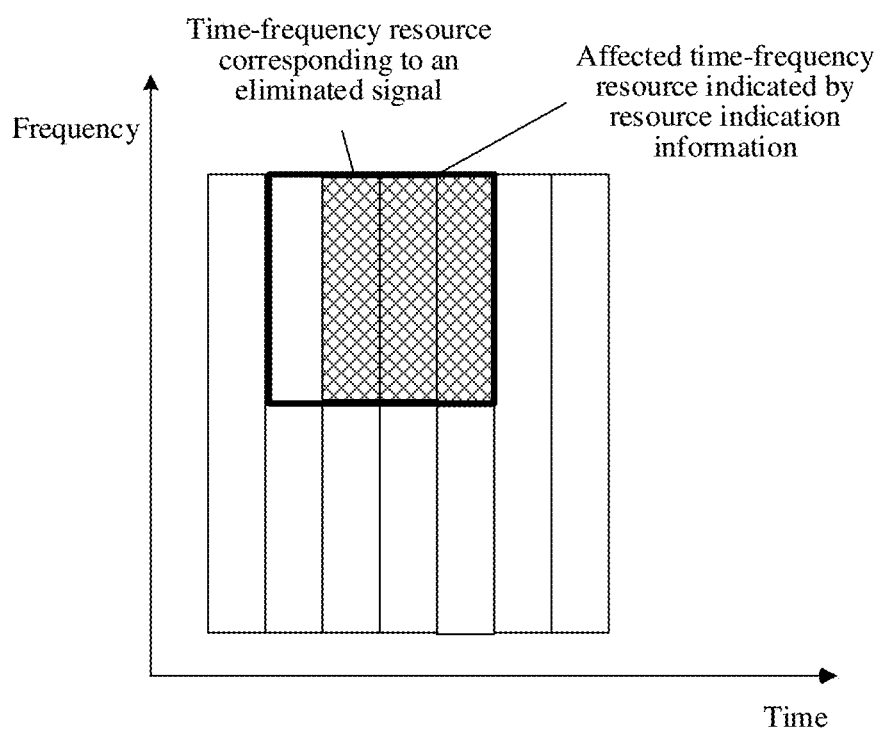
FIG. 7 is another schematic diagram of an affected CBG and an affected time-frequency resource according to an embodiment of this application.

Case 1: The fifth time-frequency resource is an intersection set between the second time-frequency resource and the fourth time-frequency resource;

FIG. 7 is a schematic diagram of an affected CBG and an affected time-frequency resource according to an embodiment of this application. A black frame in FIG. 7 marks an affected time-frequency resource that is indicated by resource indication information and that is in a time-frequency resource corresponding to a signal received by the terminal device. CBG indication information indicates that the CBG 2 and the CBG 3 are affected. The terminal device can eliminate the affected signal based on the received resource indication information and the CBG indication information, and the shading range in the figure is a time-frequency resource corresponding to the affected signal that is eliminated, that is, an intersection set between the time-frequency resource indicated by the resource indication information and the time-frequency resource indicated by the CBG indication information.

A single type of indication information can only use an indication unit as a minimum indication unit (for example, the CBG indication information uses a CBG as an indication unit, and the resource indication information uses a small time frequency unit as an indication unit), and indication accuracy is limited by a quantity of bits included in a single type of indication information. Therefore, when both types of indication information are available, a more accurate indication range can be obtained based on an intersection set between the two types of indication information. In this way, in this embodiment of this application, the terminal device can more accurately eliminate the affected signal.

In this embodiment of this application, the affected signal can be eliminated based on indication information, in the resource indication information and the CBG indication information, that has a smaller indication range. The following case 2 and case 3 are described in detail.

Case 2: The fifth time-frequency resource is the fourth time-frequency resource or the second time-frequency resource that has a smaller quantity of REs.

Specifically, the terminal device can compare all time-frequency resources indicated by the resource indication information with all CBGs indicated by the CBG indication information. Specifically, the terminal device compares the size of the time-frequency resource indicated by the resource indication information (including the quantity of resource elements or including the quantity of resource elements that are used to carry data received by the terminal device) with the size of the time-frequency resource indicated by the CBG indication information, and then eliminates the affected signal based on the time-frequency resource having a smaller size.

Figure 8:
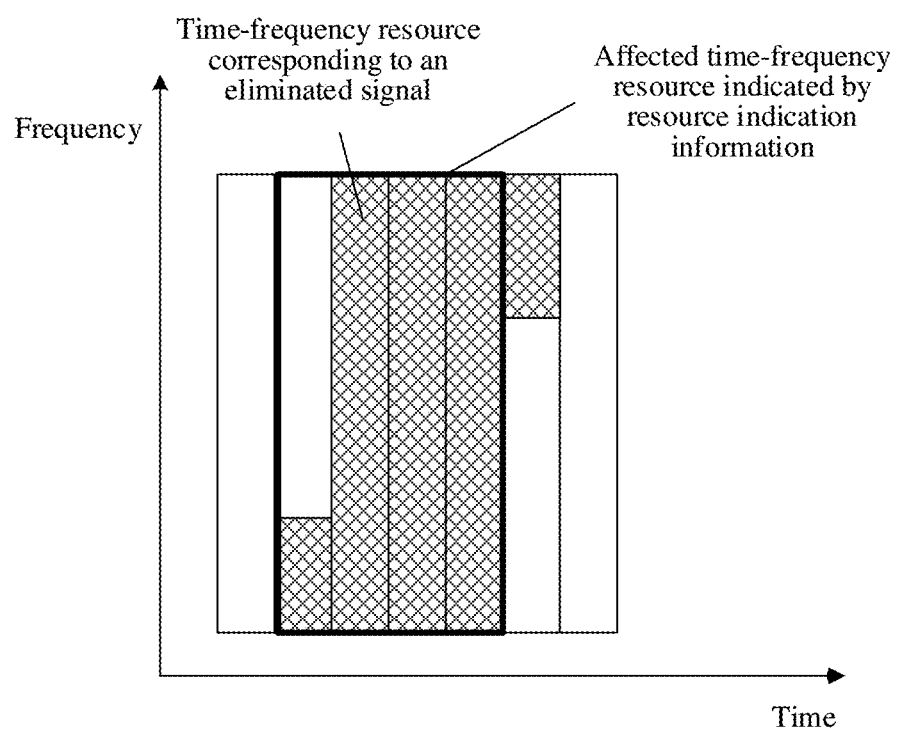
FIG. 8 is another schematic diagram of an affected CBG and an affected time-frequency resource according to an embodiment of this application.

FIG. 8 is a schematic diagram of an affected CBG and an affected time-frequency resource according to an embodiment of this application. A black frame in FIG. 8 marks an affected time-frequency resource that is indicated by resource indication information and that is in a time-frequency resource corresponding to a signal received by the terminal device. CBG indication information indicates that the CBG 2 and the CBG 3 are affected. The shading range in the figure is a time-frequency resource corresponding to an affected signal that is eliminated based on the CBG indication information having a smaller indication range after the terminal device compares the time-frequency resource indicated by the resource indication information with the time-frequency resource indicated by the CBG indication information.

Figure 9:
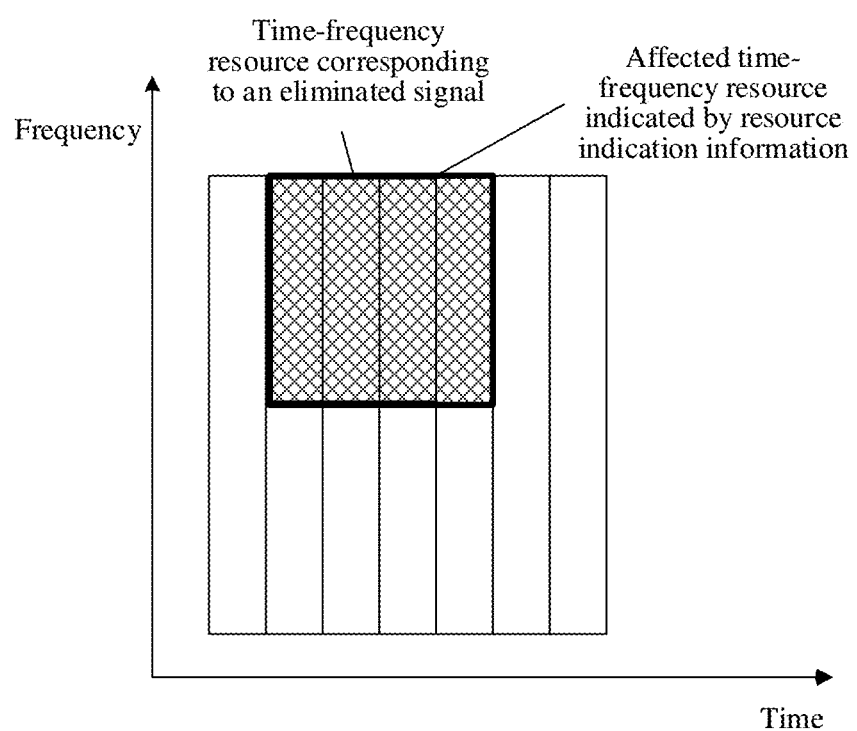
FIG. 9 is another schematic diagram of an affected CBG and an affected time-frequency resource according to an embodiment of this application.

FIG. 9 is a schematic diagram of an affected CBG and an affected time-frequency resource according to an embodiment of this application. A black frame in FIG. 9 marks an affected time-frequency resource that is indicated by resource indication information and that is in a time-frequency resource corresponding to a signal received by the terminal device. CBG indication information indicates that the CBG 2 and the CBG 3 are affected. The shading range in the figure is a time-frequency resource corresponding to an affected signal that is eliminated based on the resource indication information having a smaller indication range after the terminal device compares the time-frequency resource indicated by the resource indication information with the time-frequency resource indicated by the CBG indication information.

This embodiment of this application can provide more flexibility for the network device. For example, when a relatively small part of a CBG is affected, the network device considers that decoding reliability of the CBG is not affected even if the terminal device does not eliminate the affected part. In this case, the network device can use, based on features of the two types of indication information, one type of indication information as an elimination indication to improve efficiency and effectiveness of elimination, and then use the other type of indication information as a verification indication to improve indication reliability.

Case 3: The fifth time-frequency resource includes at least one resource corresponding to one CBG in the first CBG, where the resource is a time-frequency resource that is in a time-frequency resource corresponding to the CBG on the second time-frequency resource and a time-frequency resource corresponding to the CBG on the third time-frequency resource and that has a smaller quantity of REs.

Specifically, the terminal device first determines the CBG indicated by the CBG indication information, compares the size of the time-frequency resource indicated by the resource indication information of each indicated CBG (including the quantity of resource elements or including the quantity of resource elements that are used to carry data received by the terminal device) one by one with the size of the time-frequency resource actually occupied by the CBG, and then eliminates, based on the time-frequency resource having a smaller size, the affected signal corresponding to the CBG.

Figure 10:
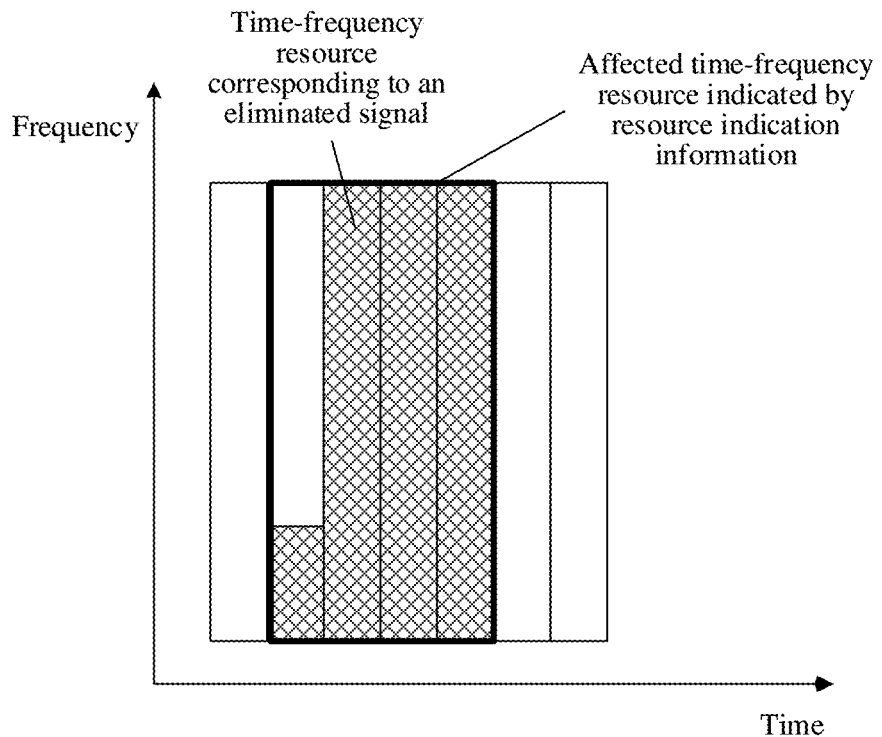
FIG. 10 is another schematic diagram of an affected CBG and an affected time-frequency resource according to an embodiment of this application.

FIG. 10 is a schematic diagram of an affected CBG and an affected time-frequency resource according to an embodiment of this application. A black frame in FIG. 10 marks an affected time-frequency resource that is indicated by resource indication information and that is in a time-frequency resource corresponding to a signal received by the terminal device. CBG indication information indicates that the CBG 2 and the CBG 3 are affected. The shading range in the figure is a time-frequency resource corresponding to an affected signal that is eliminated based on the indication information having a smaller indication range after the terminal device compares the time-frequency resource indicated by the resource indication information of each indicated CBG one by one with the time-frequency resource actually occupied by the CBG. For example, the terminal device eliminates affected signals corresponding to all time-frequency resources of the CBG 2 and some time-frequency resources of the CBG 3.

In this embodiment of this application, the terminal device can distinguish statuses of the affected CBGs one by one, so that a case in which unnecessary affected signals are excessively eliminated based only on the CBG indication information or the resource indication information is avoided, thereby improving the efficiency and effectiveness of elimination.

Further, in this embodiment of this application, before eliminating the affected signal, the terminal device can verify, by using the received CBG indication information and the received resource indication information, the signal that is to be eliminated. For example, in the examples shown in FIG. 6 to FIG. 10, the time-frequency resources of the CBG 2 and the CBG 3 that are indicated by the CBG indication information are within the range indicated by the resource indication information, the terminal device eliminates the affected signal based on the resource indication information. If the time-frequency resources of the CBGs (for example, the CBG 3 and the CBG 4) that are indicated by the CBG indication information are not within the range indicated by the resource indication information, the terminal device can consider that at least one of the two types of indication information has an error, and then determines all currently received signals as the affected signals and eliminates the affected signals.

In this embodiment of this application, the first indication information and the second indication information may have different time domain resources. In other words, the first indication information and the second indication information are located in different time units in time domain. For example, the terminal device can receive one type of indication information in a first time unit and can receive the other type of indication information in a second time unit. The first time unit precedes the second time unit in time domain. Correspondingly, the terminal device can immediately eliminate the affected signal indicated by the indication information after receiving one type of indication information at the first time. The terminal device can alternatively be inactive within a time segment (the time segment can be preconfigured in the terminal device and the network device, or be determined by the terminal device or the network device) after receiving one type of indication information at the first time. When receiving the other type of indication information within the time segment, the terminal device determines fifth time-frequency resource based on the first indication information and/or the second indication information, and eliminates the received signal on the fifth time-frequency resource. When not receiving the other type of indication information within the time segment, the terminal device can determine the fifth time-frequency resource based only on the received indication information, and eliminates the received signal on the fifth time-frequency resource.

In the foregoing embodiment, the first indication information and the second indication information can be within the same time segment, and the terminal device can determine the fifth time-frequency resource based on the first indication information and/or the second indication information. The time segment includes one or more time units, and the time unit is a frame, a subframe, a slot, a mini-slot, or a symbol. The time segment may be a period during which the terminal device monitors downlink control information; a period during which the terminal device monitors downlink control information used to schedule data transmission; a period during which the terminal device monitors the first indication information; or a period during which the terminal device monitors the second indication information.

The terminal device can determine the time segment based on an indication of the network device. For example, the network device may configure a period for the terminal device to monitor the downlink control information. When the network device configures a plurality of periods for the terminal device, the "period during which the terminal device monitors downlink control information" may be one of the plurality of periods configured by the network device. For example, the network device may configure a period for the terminal device to monitor the first indication information and/or the second indication information. Herein, the network device can configure the time segment for the terminal device through physical layer/MAC layer/RRC layer signaling.

In another example, in this embodiment of this application, if the first indication information precedes the second indication information in time domain, the fifth time-frequency resource is the second time-frequency resource; or if the second indication information precedes the first indication information in time domain, the fifth time-frequency resource is the fourth time-frequency resource.

In other words, the terminal device can eliminate the affected signal based on indication information that is relatively preceding in time domain. In addition, the terminal device can also verify the elimination based on indication information that is relatively succeeding in time domain.

Figure 11:
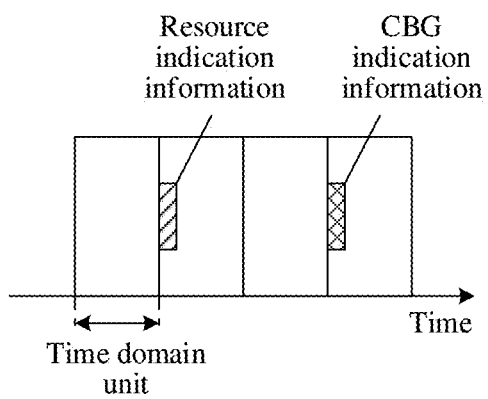
FIG. 11 is a schematic diagram of first indication information and second indication information according to an embodiment of this application.

Specifically, the terminal device eliminates the affected signal based on the indication information that is relatively preceding in time domain, and verifies the elimination based on the indication information that is relatively succeeding in time domain. If the verification finds that the previous indication information is not reliable, the terminal device can eliminate all received signals transmitted at the $n^{th}$ time. For example, the terminal device in FIG. 11 eliminates the affected signal based on the resource indication information that is relatively preceding in time domain, and verifies the elimination based on the CBG indication information. For example, the terminal device in FIG. 12 eliminates the affected signal based on the CBG indication information that is relatively preceding in time domain, and verifies the elimination based on the resource indication information.

Specifically, in this embodiment of this application, the first indication information and the second indication information can be within the same time segment, or can be within different time segments. The description of the time segment can be the foregoing description. To avoid repetition, details are not described herein again.

In this embodiment of this application, the fifth time-frequency resource is determined based on the indication information that is relatively preceding in time domain, so that the terminal device can eliminate the affected signal as soon as possible, finish processing (for example, demodulating and decoding) the received signal as soon as possible, and reduce the time interval between the HARQ feedback information and the received signal, thereby reducing the latency on the RAN side of current transmission and improving user experience of the terminal device.

In this embodiment of this application, in a process of verifying the signal that is to be eliminated by using the received CBG indication information and the received resource indication information, if the time-frequency resources of the CBGs indicated by the CBG indication information are within the range indicated by the resource indication information, it may be understood as that the time-frequency resource that corresponds to any one of the CBGs in the first CBG and that is on the first time-frequency resource includes at least one RE that is on the third time-frequency resource. In this case, the terminal device eliminates the signal received on the fourth time-frequency resource. If the time-frequency resources of the CBGs indicated by the CBG indication information are not within the range indicated by the resource indication information, it may be understood as that the time-frequency resource that corresponds to a CBG in the first CBG and that is on the first time-frequency resource does not include any one of the REs that are on the third time-frequency resource. In this case, the terminal device may determine the time-frequency resource that corresponds to the first transport block and that is on the first time-frequency resource as the fourth time-frequency resource, and may eliminate the signal received on the first time-frequency resource, that is, eliminate the received signal of the first transport block.

In this embodiment of this application, the terminal device does not use the signal on the fifth time-frequency resource to decode the first transport block. Specifically, if the terminal device determines the fifth time-frequency resource before decoding for the $(n+i)^{th}$ transmission of the first transport block, the terminal device does not use the signal on the fifth time-frequency resource in a decoding process for the $(n+i)^{th}$ transmission and after the $(n+i)^{th}$ transmission of the first transport block, where i is a natural number.

In another example, after determining the fifth time-frequency resource, the terminal device may further determine a sixth time-frequency resource. If the first indication information precedes the second indication information in time domain, the fifth time-frequency resource is the second time-frequency resource, and the sixth time-frequency resource is the fourth time-frequency resource; or if the second indication information precedes the first indication information in time domain, the fifth time-frequency resource is the fourth time-frequency resource, and the sixth time-frequency resource is the second time-frequency resource. In this case, the method further includes: decoding, by the terminal device, the first transport block without using the signal on the fifth time-frequency resource; and setting, by the terminal device, information that corresponds to the sixth time-frequency resource and that is in the soft buffer to 0.

Specifically, the terminal device receives the second indication information, and determines the fifth time-frequency resource based on the second indication information, where the fifth time-frequency resource is the fourth time-frequency resource. The terminal device does not use the signal on the fifth time-frequency resource to decode the first transport block. Specifically, in a decoding process after the fifth time-frequency resource is determined, the terminal device does not use the signal on the fifth time-frequency resource to decode the first transport block. In addition, the terminal device stores another signal different from the signal on the fifth time-frequency resource in the received signal that is sent at the $n^{th}$ time and that is of the first transport block into the soft buffer. If the terminal device receives the first indication information after receiving the second indication information, the terminal device determines the sixth time-frequency resource based on the first indication information. The sixth time-frequency resource is the second time-frequency resource. The terminal device sets information that corresponds to the sixth time-frequency resource and that is in the soft buffer to 0. The information corresponding to the sixth time-frequency resource may be information that corresponds to encoded bits originally carried by the sixth time-frequency resource and that is in the soft buffer. The "encoded bits originally carried by the sixth time-frequency resource" may be encoded bits that are determined by the terminal device based on the first control information when the first control information instructs the terminal device to receive the received signal that is sent at the $n^{th}$ time and that is of the first transport block, where the encoded bits are encoded bits of the first transport block that are carried by the sixth time-frequency resource.

Alternatively, specifically, the terminal device receives the first indication information, and determines the fifth time-frequency resource based on the first indication information, where the fifth time-frequency resource is the second time-frequency resource. The terminal device does not use the signal on the fifth time-frequency resource to decode the first transport block. Specifically, in a decoding process after the fifth time-frequency resource is determined, the terminal device does not use the signal on the fifth time-frequency resource to decode the first transport block. In addition, the terminal device stores another signal different from the signal on the fifth time-frequency resource in the received signal that is sent at the $n^{th}$ time and that is of the first transport block into the soft buffer. If the terminal device receives the second indication information after receiving the first indication information, the terminal device determines the sixth time-frequency resource based on the second indication information. The sixth time-frequency resource is the fourth time-frequency resource. The terminal device sets information that corresponds to the sixth time-frequency resource and that is in the soft buffer to 0.

The foregoing example provides scheduling flexibility for the network device, so that the network device can instruct the terminal device to eliminate the affected signal by sending two types of indication information step by step. For example, after sending indication information (the first indication information or the second indication information) indicating a signal that is not used for decoding to the terminal device, the network device determines that the terminal device is likely to fail to receive the indication information (for example, depending on whether the terminal device feeds back a corresponding feedback signal), and the network device may send other indication information (the second indication information or the first indication information) instructing the terminal device to eliminate (set to 0) information that is most likely to be affected in the soft buffer. After sending indication information indicating a signal that is not used for decoding to the terminal device, the network device determines that the terminal device is likely to have received indication information correctly, and the network device may not send the other indication information.

In another possible implementation of this embodiment of this application, the terminal device receives at least the CBG indication information. The following describes in detail how the terminal device "eliminates the affected signal" based on the CBG indication information. In this case, the terminal device may only receive the CBG indication information, and eliminate the received signal that is affected based on the CBG indication information, or the terminal device may receive the resource indication information and the CBG indication information, determine, based on the method described above (or a method not disclosed in this application), that the received signal that is affected is eliminated based on the CBG indication information, and perform elimination by using a method described below.

Optionally, in this embodiment of this application, the network device can send second control information to the terminal device. The second control information includes the first indication information. The second control information is further used to instruct the terminal device to receive, on a seventh time-frequency resource, a second CBG in the first transport block sent by the network device at an $(n+k)^{th}$ time, where k is a positive integer. It should be noted that a value of k may be preset in the terminal device and/or the network device, or may be indicated, by the network device, to the terminal device through physical layer signaling, media access control (media access control, MAC) layer signaling, or radio resource control (RRC) layer signaling.

Specifically, the second control information may further include third indication information. The third indication information is used to instruct the terminal device to receive, on the seventh time-frequency resource, the second CBG in the first transport block sent by the network device at the $(n+k)^{th}$ time. That is, the third indication information is used to indicate CBGs that are scheduled at this time.

In a possible implementation, the first indication information and the third indication information may be the same indication information. To be specific, the first indication information not only can instruct the terminal device that the received signals on the second time-frequency resource in the first time-frequency resource include a signal that is not used for the terminal device to decode the first transport block, but also can instruct the terminal device to receive, on the seventh time-frequency resource, the second CBG in the first transport block sent by the network device at the $(n+k)^{th}$ time.

In this embodiment of this application, the second CBG may be supplemental transmission (or referred to as additional repetition or supplemental repetition) CBG. This is not limited in the present invention.

In a possible implementation of this embodiment of this application, all signals of the CBG indicated by the first indication information are eliminated.

Alternatively, in another possible implementation of this embodiment of this application, some or all signals of the CBG are eliminated as described below.

In an example, the first indication information may include Z bits. One of the Z bits corresponds to 1/Z of the first time-frequency resource corresponding to all encoded bits of the second CBG; or one indication state of the Z bits corresponds to $1/(2^Z)$ of the first time-frequency resource corresponding to all encoded bits of the second CBG.

Herein, the second CBG may be divided into Z copies, and each copy is identified by 1 bit of the first indication information. A part in which the bit is 1 represents to eliminate, and a part in which the bit is o represents not to eliminate, or a part in which the bit is o represents to eliminate, and a part in which the bit is i represents not to eliminate. It should be noted that herein, instead of including Z CBGs by the second CBG, all second CBGs are put together and divided into Z copies. One method is to arrange the REs corresponding to the CBGs into a queue according to the sequence of CBG mapping, and then divide the queue into Z copies. Each copy corresponds to one copy of time-frequency resource, and a CBG transmitted by each copy of time-frequency resource corresponds to one copy of encoded bit. Another method is to arrange the encoded bits corresponding to the CBGs in the $(n+k)^{th}$ transmission into a queue according to the sequence of the CBG sequence numbers, and then divide the queue into Z copies. Each copy corresponds to one copy of encoded bit.

Figures 12, 13, 14:
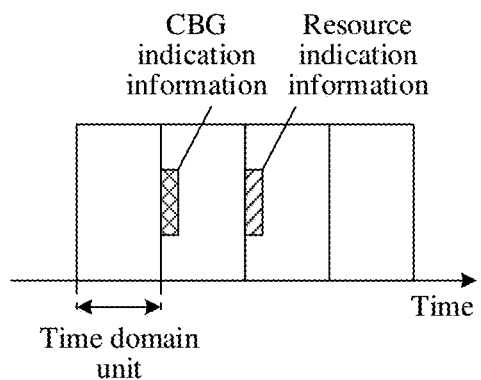
FIG. 12 is another schematic diagram of first indication information and second indication information according to an embodiment of this application.
FIG. 13 shows a correspondence between a CBG and an encoded bit according to an embodiment of this application.
FIG. 14 shows another correspondence between a CBG and an encoded bit according to an embodiment of this application.

For example, FIG. 13 shows a correspondence between a CBG and an encoded bit. It can be seen that Z1 to Z6 correspond to Z copies of encoded bits in the queue of the encoded bits of the $(n+k)^{th}$ transmission of the first transport block, respectively. All second CBGs that are sent by the network device indicated by the second control information may include 4 CBGs: a second CBG #1, a second CBG #2, a second CBG #3, and a second CBG #4. In the figure, each CBG in the second CBG corresponds to one encoded bit of the CBG of the $(n+k)^{th}$ transmission of the first transport block in the queue of the encoded bits. It is assumed that Z (Z=6) bits included in the first indication information are 110000, and the first copy of encoded bit and the second copy of encoded bit in the queue of the encoded bits are to be eliminated. However, at this time, the first copy of encoded bit and the second copy of encoded bit correspond to all time-frequency resources of the CBG numbered #1 in the first CBG and some time-frequency resources of the CBG numbered #2 in the second CBGs (as shown in the shading part in the figure) on the first time-frequency resource. Therefore, when the first indication information is 110000, the first indication information can indicate that all time-frequency resources of the first CBG #1 and some time-frequency resources of the second CBGs are to be eliminated, and the second CBG #1 to the second CBG #4 are to be accepted.

Similarly, the second CBG may be divided into $2^Z$ copies, and each copy is identified by one status of the Z bits of the first indication information. Only one of the identified copies can be eliminated each time, or vice versa. It should be noted that herein, instead of including $2^Z$ CBGs by the second CBG, all second CBGs are put together and divided into $2^Z$ copies. One method is to arrange the REs corresponding to the CBGs into a queue according to the sequence of CBG mapping, and then divide the queue into $2^Z$ copies. Each copy corresponds to one copy of time-frequency resource, and a CBG transmitted by each copy of time-frequency resource corresponds to one copy of encoded bit. Another method is to arrange the encoded bits corresponding to the CBGs in the $(n+k)^{th}$ transmission into a queue according to the sequence of the CBG sequence numbers, and then divide the queue into $2^Z$ copies. Each copy corresponds to one copy of encoded bit.

For example, FIG. 14 shows a correspondence between a CBG and an encoded bit. It is assumed that Z=2, and all second CBGs that are sent by the network device indicated by the second control information may be divided into 4 copies: a second CBG #1, a second CBG #2, a second CBG #$_3$, and a second CBG #$_4$. Each CBG in the second CBG corresponds to one encoded bit of the $(n+k)^{th}$ transmission of the first transport block in the queue of the encoded bits. In this case, the first indication information has 2 bits, that is, 4 statuses. Each status may correspond to ¼ of the second CBG. For example, 01 may identify the second CBG #1 and corresponds to a first copy of encoded bit in the queue of the encoded bits. However, at this time, the first copy of encoded bit corresponds to all time-frequency resources of the first CBG #1 in the first time-frequency resource (as shown in the shading part in the figure), and all first copies of encoded bits in the soft buffer is to be eliminated. Therefore, when the first indication information is 01, the first indication information can indicate that all time-frequency resources of the first CBG #1 are to be eliminated, and the second CBG #1 to the second CBG #4 are to be accepted.

It should be noted that, in the embodiments corresponding to FIG. 13 and FIG. 14, the CBG indication information (that is, the first indication information) may only indicate CBGs in the first information block that are transmitted in the $(n+k)^{th}$ transmission, while in other embodiments of this application, the CBG indication information may be used to indicate the CBGs that need to be eliminated.

Therefore, in this embodiment of this application, a to-be-eliminated part or parts in the CBG can be accurately indicated, thereby avoiding indiscriminately eliminating all received signals of the CBG each time. Therefore, the efficiency of the elimination can be effectively improved, unnecessary transmission waste caused by excessive elimination can be reduced, thereby saving the receiving processing of the terminal device and reducing power consumption. In addition, this embodiment of this application can improve the indication accuracy.

Optionally, in this embodiment of this application, the first control information is further used to indicate a first redundancy version (Redundancy version, RV) of the first CBG in a soft buffer to the terminal device. The second control information is further used to indicate a second redundancy version of the second CBG in the soft buffer to the terminal device. If encoded bits corresponding to the second redundancy version are included in an encoded bit block of the first CBG sent at an $n^{th}$ time in the soft buffer, the second time-frequency resource is a resource corresponding to the encoded bits that correspond to locations of the first CBG on the first time-frequency resource, where the locations are from the second redundancy version to the encoded bit block of the first CBG sent at the $n^{th}$ time in the soft buffer. If encoded bits corresponding to the second redundancy version are not included in the encoded bit block of the first CBG sent at the $n^{th}$ time in the soft buffer, the second time-frequency resource is all resources corresponding to the first CBG on the first time-frequency resource.

Figure 15:
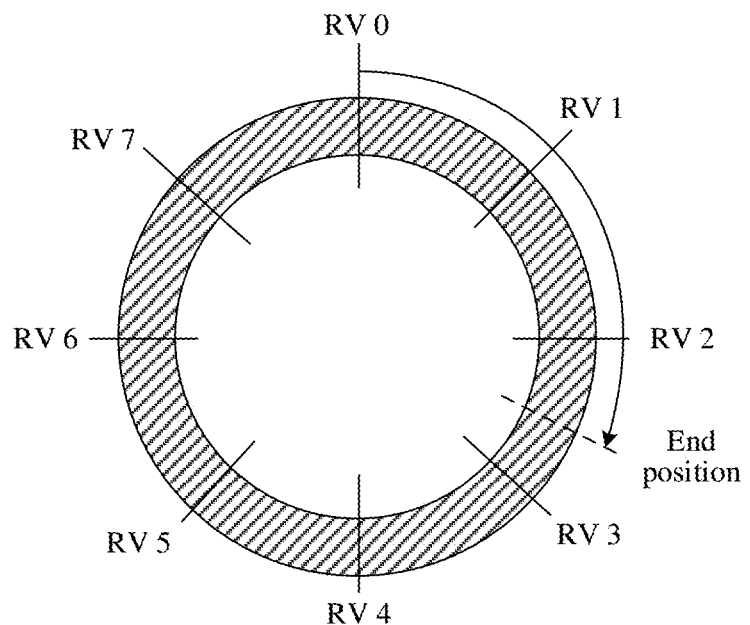
FIG. 15 shows a circular buffer according to an embodiment of this application.

Specifically, in the 5G NR system and the LTE system, after dividing the information block that is to be sent into a plurality of CBs, a sending device performs channel encoding on each CB, and then constructs a circular buffer shown in FIG. 15 based on channel encoded bits. There are a plurality of locations in the circular buffer. The locations may be starting locations of one transmission, usually referred to as redundancy versions (also referred to as transmission starting locations or version locations, and the present invention is not limited thereto). Each circular buffer has four redundancy versions in the LTE system. A quantity of redundancy versions of a cyclic buffer in the NR system is greater than or equal to four. When the network device schedules transmission of the terminal device, a coding modulation mode, a redundancy version and a time-frequency resource of the transmission are specified. That is, encoded bits sent in this transmission are read from the circular buffer, a starting location of reading is the specified redundancy version, and a length of reading is determined by the modulation scheme and a quantity of resource elements that are used to carry the data.

For example, during the $n^{th}$ transmission related to the first transport block received by the terminal device, the transmitted CB/CBG starts from an $a^{th}$ RV in the circular buffer, and the entire bit sequence that is read includes x RVs, that is, an RV a, . . . , an RV(a+x−1). For example, the arrow shown in FIG. 15 represents an encoded bit sequence that is read in one transmission. The sequence starts from an RV 0, passes through an RV 1 and an RV 2, and then stops at the dashed line location. Therefore, a=0, and x=3.

When the terminal device receives the scheduling information of the $(n+k)^{th}$ transmission related to the first transport block (that is, the second control information), where the scheduling information carries the CBG indication information related to $n^{th}$ reception), if the second redundancy version indicated by the scheduling information is one of the x RVs, for example, an RV(a+1), the terminal device eliminates, from the signals received at the $n^{th}$ time, the CBG-related signal indicated by the CBG indication information. Specifically, the terminal device eliminates the signals corresponding to the encoded bits of the CBGs that start from the RV(a+1) and that end at this time. Then, the second redundancy version of the CBGs in the $(n+k)^{th}$ transmission starts from the RV(a+1).

If the second redundancy version indicated by the scheduling information is not included in the x RVs, the terminal device eliminates, from the signals received at the $n^{th}$ time, all CBG-related signals indicated by the CBG indication information.

Therefore, in this embodiment of this application, a case in which all received signals of the CBG are indiscriminately eliminated each time can be avoided without additional indication information. Therefore, the efficiency of the elimination can be effectively improved, unnecessary transmission waste caused by excessive elimination can be reduced, thereby saving the receiving processing of the terminal device and reducing power consumption.

Optionally, the second CBG in the first transport block sent by the network device at the $(n+k)^{th}$ time (that is, the second CBG of the seventh time-frequency resource) can carry T encoded bits of the first transport block. The terminal device may further determine a quantity of encoded bits of a CB in the second CBG that is carried on the seventh time-frequency resource.

If the first redundancy version is equal to the second redundancy version, the quantity of encoded bits of the CB is equal to a value obtained by rounding of T/X. If the first redundancy version is not equal to the second redundancy version, the quantity of encoded bits of the CB is equal to a value obtained by rounding S+F(T−Y×S)/X or rounding (T−Y×S)/X. The rounding may be one of rounding up, rounding down, or rounding off.

X is the quantity of CBs in the second CBG, S is the quantity of encoded bits between the first redundancy version and the second redundancy version in the soft buffer, and Y is the quantity of CBs in the first CBG, where T, X, S, and Y are all positive integers.

Herein, after receiving the scheduling information of the $(n+k)^{th}$ transmission, and after eliminating the affected signals, the terminal device may determine the time-frequency resources that are occupied by the CBs scheduled at this time based on the second control information.

In an example, when the terminal device eliminates all CBGs on the second time-frequency resource or eliminates no CBG on the second time-frequency resource, the resources occupied by each CB are the same (that is, the resource are equally divided based on the quantity of CBs), and the RV versions of all CB transmission are the RV version indicated by the scheduling information of the $(n+k)^{th}$ transmission. Therefore, implementation is simple, and implementation complexity of the terminal device can be reduced.

In another example, only the signals of $n^{th}$ transmission of some CBGs in this transmission are eliminated, and CBs in the CBGs that are eliminated occupy more resources than CBs in the CBG that are not eliminated.

Specifically, when a previous RV (that is, an RV that is indicated by the network device in the $n^{th}$ transmission) is not equal to a current RV (that is, an RV that is indicated by the network device in the $(n+k)^{th}$ transmission), it is assumed that S encoded bits are included between the previous RV and the current RV, Y CBs of the X CBs that are scheduled at this time are eliminated, and the total time-frequency resources that are transmitted at this time can carry T encoded bits. Therefore, the quantity of encoded bits that are read from the circular buffer of each CB that is eliminated at this time is $S+F(T-Y*S)/X$, and the starting location that is read at this time is the RV indicated by the network device in the $n^{th}$ transmission. The quantity of encoded bits that are read from the circular buffer of each CB that is not eliminated at this time is $(T-Y \times S)/X$, and the starting location that is read at this time is the RV indicated by the network device in the $(n+k)^{th}$ transmission.

When the previous RV is equal to the current RV, each CB is equal to T/X.

Further, since a quantity of bits obtained when the division is performed in the foregoing method may not be an integer, the quantity of encoded bits of a CB in the second CBG may be determined according to the following method.

Specifically, the quantity of (X−1) encoded bits of the X encoded bits is calculated according to the following formula.

If the CB is eliminated, the quantity of encoded bits transmitted at this time is rounding of $[S+(T-Y \times S)/X]$. If the CB is not eliminated, the quantity of encoded bits transmitted at this time is rounding of $[(T-Y \times S)/X]$.

The quantity of the other one encoded bit of X encoded bits is equal to: a sum of the encoded bits of (T-remaining (X−1)) CBs calculated according to the foregoing formula.

The CB may be the first of all CBs, or may be the last of all CBs. The CB may be the first of all CBs that are eliminated, or may be the last of all CBs that are eliminated. The CB may be the first of all CBs that are not eliminated, or may be the last of all CBs that are not eliminated.

Therefore, in this embodiment of this application, the received signals that are eliminated and that are of the $n^{th}$ transmission can be compensated for the terminal device in the $(n+k)^{th}$ transmission, thereby effectively reducing the impact of the elimination operation on reliability of transmitting the first information block.

Figure 16:
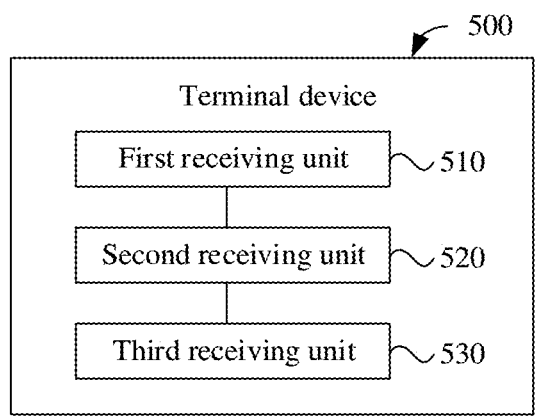
FIG. 16 is a schematic block diagram of a terminal device according to an embodiment of this application.

FIG. 16 is a schematic block diagram of a terminal device 500 according to an embodiment this application. The terminal device 500 includes: a first receiving unit 510, configured to receive, by the terminal device, first control information sent by a network device, where the first control information is used to instruct the terminal device to receive, on a first time-frequency resource, a first transport block sent by the network device at an $n^{th}$ time; a second receiving unit 520, configured to receive, by the terminal device, the first transport block on the first time-frequency resource; and a third receiving unit 530, configured to receive, by the terminal device, first indication information sent by the network device, where the first indication information is used to indicate a first code block group CBG in the first transport block, and the first CBG corresponds to a second time-frequency resource during $n^{th}$ transmission of the first transport block, where n is an integer greater than or equal to 0.

Therefore, in this embodiment of this application, the network device sends the first indication information to the terminal device, where the first indication information is used to indicate the first code block group CBG in the first transport block, and the first CBG corresponds to the second time-frequency resource during the $n^{th}$ transmission of the first transport block, so that the terminal device can perform subsequent demodulation decoding based on the first indication information, thereby improving reliability of the transmission of the service whose resource is preempted.

Optionally, the terminal device 500 further includes: the third receiving unit 530, further configured to receive, by the terminal device, second indication information sent by the network device, where the second indication information is used to indicate a third time-frequency resource, and an intersection set between the third time-frequency resource and the first time-frequency resource is a fourth time-frequency resource; and a determining unit, configured to determine, by the terminal device, a fifth time-frequency resource based on the first indication information and/or the second indication information, where the fifth time-frequency resource includes at least one resource element (RE), the at least one RE is included in the first time-frequency resource, and received signals on the fifth time-frequency resource include a signal that is not used for the terminal device to decode the first transport block.

Optionally, the fifth time-frequency resource is the fourth time-frequency resource; the fifth time-frequency resource is an intersection set between the second time-frequency resource and the fourth time-frequency resource; the fifth time-frequency resource is the fourth time-frequency resource or the second time-frequency resource that has a smaller quantity of REs; or the fifth time-frequency resource includes at least one resource corresponding to one CBG in the first CBG, where the resource is a time-frequency resource that is in a time-frequency resource corresponding to the CBG on the second time-frequency resource and a time-frequency resource corresponding to the CBG on the fourth time-frequency resource and that has a smaller quantity of REs.

Optionally, the first indication information and the second indication information are within a same time segment in time domain, the time segment includes one or more time units, the time unit is a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

Optionally, if the first transport block includes only one code block, the fifth time-frequency resource is the fourth time-frequency resource.

Optionally, if the first indication information precedes the second indication information in time domain, the fifth time-frequency resource is the second time-frequency resource; or if the second indication information precedes the first indication information in time domain, the fifth time-frequency resource is the fourth time-frequency resource.

Optionally, the first indication information and the second indication information are within different time segments in time domain, or the first indication information and the second indication information are within a same time segment in time domain, where the time segment includes one or more time units, the time unit is one of a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

Optionally, if there is no intersection set between the second time-frequency resource and the fourth time-frequency resource, the fifth time-frequency resource is the first time-frequency resource.

Figure 17:
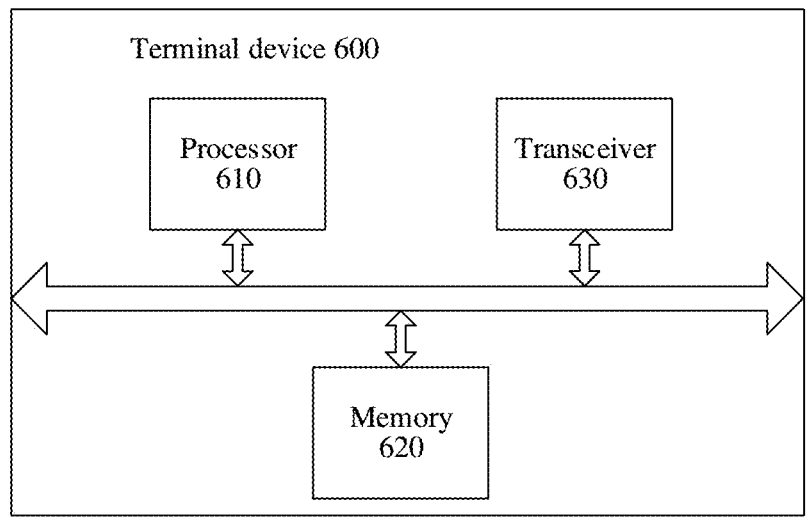
FIG. 17 is a schematic block diagram of another terminal device according to an embodiment of this application.

It should be noted that, in this embodiment of this application, the first receiving unit 510, the second receiving unit 520 and the third receiving unit 530 can be implemented by a transceiver, and the determining unit can be implemented by a processor. As shown in FIG. 17, a terminal device 600 may include a processor 610, a memory 620 and a transceiver 630. The memory 620 may be configured to store code executed by the processor 610 and the like. It should be understood that the foregoing transceiver may include a transmitter and a receiver. The transceiver may further include an antenna, and there may be one or more antennas. The memory may be a separate component, or may be integrated into the processor. The foregoing components or some components may be integrated into a chip for implementation, for example, integrated into a baseband chip for implementation.

Network devices or terminal devices in apparatus and method embodiments completely correspond to each other. A corresponding step is performed by a corresponding module. For example, a sending module method or a transmitter performs a step of sending in the method embodiments, a receiving module or a receiver performs a step of receiving in the method embodiments, and other steps different from steps of sending and receiving may be performed by a processing module or a processor. For a function of a specific module, refer to a corresponding method embodiment. Details are not described again.

In an implementation process, steps in the foregoing methods can be implemented by using a hardware integrated logical circuit in the processor 610, or by using instructions in a form of software. The steps of the method disclosed with reference to this embodiment of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 620, and a processor 610 reads information in the memory 620 and completes the steps in the foregoing methods in combination with hardware of the processor. To avoid repetition, details are not described herein again.

The terminal device 500 shown in FIG. 16 or the terminal device 600 shown in FIG. 17 can implement processes corresponding to the foregoing embodiment of the method shown in FIG. 3. Specifically, for the terminal device 500 or the terminal device 600, refer to the description in FIG. 3. To avoid repetition, details are not described herein again.

An embodiment of this application provides a computer-readable medium, configured to store a computer program. The computer program includes an instruction used to perform the method corresponding to the terminal device in the implementations in FIG. 3.

An embodiment of this application further provides a communication chip, storing an instruction, and when being run on the terminal device 500 or the terminal device 600, the instruction enables the communication chip to perform the method corresponding to the terminal device in the implementations in FIG. 6.

Figure 18:
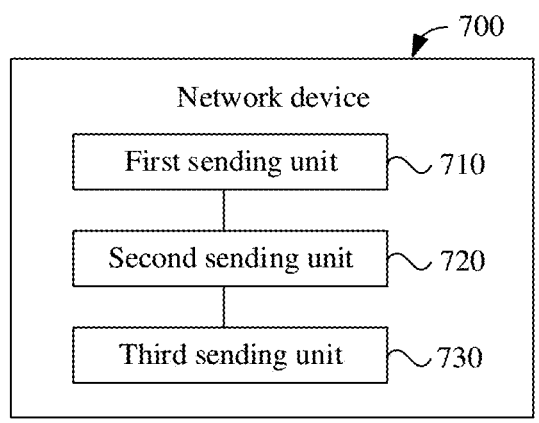
FIG. 18 is a schematic block diagram of a network device according to an embodiment of this application.

FIG. 18 is a schematic block diagram of a network device 700 according to an embodiment of this application. The network device 700 includes: a first sending unit 710, configured to send, by the network device, first control information to a terminal device, where the first control information is used to instruct the terminal device to receive, on a first time-frequency resource, a first transport block sent by the network device at an nth time; a second sending unit 720, configured to send, by the network device, the first transport block to the terminal device on the first time-frequency resource; and a third sending unit 730, configured to send, by the network device, first indication information to the terminal device, where the first indication information is used to indicate a first code block group CBG in the first transport block, and the first CBG corresponds to a second time-frequency resource during $n^{th}$ transmission of the first transport block, where n is an integer greater than or equal to 0.

Therefore, in this embodiment of this application, the network device sends the first indication information to the terminal device, where the first indication information is used to indicate the first code block group CBG in the first transport block, and the first CBG corresponds to the second time-frequency resource during the $n^{th}$ transmission of the first transport block, so that the terminal device can perform subsequent demodulation decoding based on the first indication information, thereby improving the reliability of the transmission of the service whose resource is preempted.

Optionally, the third sending unit 730 is further configured to send, by the network device, second indication information to the terminal device, where the second indication information is used to indicate a third time-frequency resource, and an intersection set between the third time-frequency resource and the first time-frequency resource is a fourth time-frequency resource; and the first indication information and/or the second indication information is used for the terminal device to determine fifth time-frequency resource, where the fifth time-frequency resource includes at least one resource element (RE), the at least one RE is included in the first time-frequency resource, and received signals on the fifth time-frequency resource include a signal that is not used for the terminal device to decode the first transport block.

Optionally, the fifth time-frequency resource is the fourth time-frequency resource; the fifth time-frequency resource is an intersection set between the second time-frequency resource and the fourth time-frequency resource; the fifth time-frequency resource is the fourth time-frequency resource or the second time-frequency resource that has a smaller quantity of REs; or the fifth time-frequency resource includes at least one resource corresponding to one CBG in the first CBG, where the resource is a time-frequency resource that is in a time-frequency resource corresponding to the CBG on the second time-frequency resource and a time-frequency resource corresponding to the CBG on the fourth time-frequency resource and that has a smaller quantity of REs.

Optionally, the first indication information and the second indication information are within a same time segment in time domain, the time segment includes one or more time units, the time unit is a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

Optionally, if the first transport block includes only one code block, the fifth time-frequency resource is the fourth time-frequency resource.

Optionally, if the first indication information precedes the second indication information in time domain, the fifth time-frequency resource is the second time-frequency resource; or if the second indication information precedes the first indication information in time domain, the fifth time-frequency resource is the fourth time-frequency resource.

Optionally, the first indication information and the second indication information are within different time segments in time domain, or the first indication information and the second indication information are within a same time segment in time domain, where the time segment includes one or more time units, the time unit is one of a frame, a subframe, a slot, a mini-slot, or a symbol, and the time segment is: a period during which the terminal device monitors downlink control information; a period during which the terminal device monitors downlink control information used to schedule data transmission; a period during which the terminal device monitors the first indication information; or a period during which the terminal device monitors the second indication information.

Optionally, if there is no intersection set between the second time-frequency resource and the fourth time-frequency resource, the fifth time-frequency resource is the first time-frequency resource.

Figure 19:
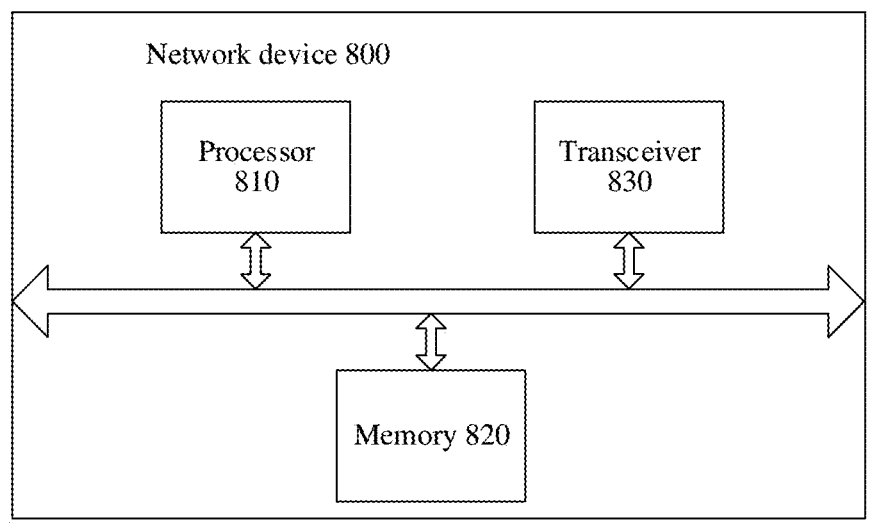
FIG. 19 is schematic block diagram of another network device according to an embodiment of this application.

It should be noted that, in this embodiment of this application, the first sending unit 710, the second sending unit 720 and the third sending unit 730 can be implemented by a transceiver. As shown in FIG. 19, a network device 800 may include a processor 810, a memory 820, and a transceiver 830. The processor 810 may be configured to determine information sent by the transceiver 830, and the memory 820 may be configured to store code executed by the processor 810, and the like. It should be understood that the foregoing transceiver may include a transmitter and a receiver. The transceiver may further include an antenna, and there may be one or more antennas. The memory may be a separate component, or may be integrated into the processor. The foregoing components or some components may be integrated into a chip for implementation, for example, integrated into a baseband chip for implementation.

Network devices or terminal devices in apparatus and method embodiments completely correspond to each other. A corresponding step is performed by a corresponding module. For example, a sending module method or a transmitter performs a step of sending in the method embodiments, a receiving module or a receiver performs a step of receiving in the method embodiments, and other steps different from steps of sending and receiving may be performed by a processing module or a processor. For a function of a specific module, refer to a corresponding method embodiment. Details are not described again.

In an implementation process, steps in the foregoing methods can be implemented by using a hardware integrated logical circuit in the processor 810, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 820, and a processor 810 reads information in the memory 820 and completes the steps in the foregoing methods in combination with hardware of the processor. To avoid repetition, details are not described herein again.

The network device 700 shown in FIG. 18 or the network device 800 shown in FIG. 19 can implement processes corresponding to the foregoing embodiment of the method shown in FIG. 3. Specifically, for the network device 700 or the network device 800, refer to the description in FIG. 3. To avoid repetition, details are not described herein again.

An embodiment of this application provides a computer-readable medium, configured to store a computer program. The computer program includes an instruction used to perform the method corresponding to the network device in the implementations in FIG. 3.

An embodiment of this application further provides a communication chip, storing an instruction, and when being run on the network device 700 or the network device 800, the instruction enables the communication chip to perform the method corresponding to the network device in the implementations in FIG. 3.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, first control information sent by a network device, wherein the first control information instructs the terminal device to receive, on a first time-frequency resource, a first transport block sent by the network device at an $n^{th}$ time, wherein n is an integer greater than o;
   receiving, by the terminal device, the first transport block on the first time-frequency resource; and
   receiving, by the terminal device, first indication information sent by the network device, wherein the first indication information indicates a first code block group (CBG) in the first transport block, and the first CBG corresponds to a second time-frequency resource during an $n^{th}$ transmission of the first transport block.

2. The method according to claim 1, further comprising:
   receiving, by the terminal device, second indication information sent by the network device, wherein the second indication information indicates a third time-frequency resource, and wherein an intersection set between the third time-frequency resource and the first time-frequency resource is a fourth time-frequency resource; and
   determining, by the terminal device, a fifth time-frequency resource, wherein the fifth time-frequency resource comprises at least one resource element (RE), the at least one RE is comprised in the first time-frequency resource, and received signals on the fifth time-frequency resource comprise a first signal that is not used by the terminal device to decode the first transport block.

3. The method according to claim 2, wherein:
   the fifth time-frequency resource is the fourth time-frequency resource;
   the fifth time-frequency resource is an intersection set between the second time-frequency resource and the fourth time-frequency resource;
   when the second time-frequency resource has a smaller quantity of REs than the fourth time-frequency resource, the fifth time-frequency resource is the second time-frequency resource;
   when the fourth time-frequency resource has a smaller quantity of REs than the second time-frequency resource, the fifth time-frequency resource is the fourth time-frequency resource; or
   the fifth time-frequency resource comprises at least one first resource corresponding to one CBG in the first CBG, wherein the at least one first resource is a time-frequency resource that is in a time-frequency resource corresponding to the first CBG on the second time-frequency resource and a time-frequency resource corresponding to the first CBG on the fourth time-frequency resource and that has a smaller quantity of REs.

4. The method according to claim 3, wherein the first indication information and the second indication information are sent within a same time segment in time domain, the same time segment comprises one or more time units, each time unit of the one or more time units is a frame, a subframe, a slot, a mini-slot, or a symbol, and the same time segment is:
   a period during which the terminal device monitors downlink control information;
   a period during which the terminal device monitors downlink control information used to schedule data transmission;
   a period during which the terminal device monitors the first indication information; or
   a period during which the terminal device monitors the second indication information.

5. The method according to claim 2, wherein the first transport block comprises one code block, and the fifth time-frequency resource is the fourth time-frequency resource.

6. The method according to claim 2, wherein:
   the first indication information precedes the second indication information in time domain, and the fifth time-frequency resource is the second time-frequency resource; or
   the second indication information precedes the first indication information in time domain, the fifth time-frequency resource is the fourth time-frequency resource.

7. The method according to claim 6, wherein the first indication information and the second indication information are sent within different time segments in time domain, or the first indication information and the second indication information are sent within a same time segment in time domain, wherein each time segment comprises one or more time units, each time unit of the one or more time units is one of a frame, a subframe, a slot, a mini-slot or a symbol, and each time segment is:
  a period during which the terminal device monitors downlink control information;
  a period during which the terminal device monitors downlink control information used to schedule data transmission;
  a period during which the terminal device monitors the first indication information; or
  a period during which the terminal device monitors the second indication information.

8. The method according to claim 2, wherein there is no intersection set between the second time-frequency resource and the fourth time-frequency resource, and the fifth time-frequency resource is the first time-frequency resource.

9. A terminal device, comprising:
  a receiver, configured to:
    receive first control information sent by a network device, wherein the first control information instructs the terminal device to receive, on a first time-frequency resource, a first transport block sent by the network device at an $n^{th}$ time, wherein n is an integer greater than 0;
    receive the first transport block on the first time-frequency resource; and
    receive first indication information sent by the network device, wherein the first indication information indicates a first code block group (CBG) in the first transport block, and the first CBG corresponds to a second time-frequency resource during $n^{th}$ transmission of the first transport block.

10. The terminal device according to claim 9, further comprising:
  a processor; and
  a non-transitory computer-readable storage medium storing a program to be executed by the processor;
  wherein the receiver is further configured to receive second indication information sent by the network device, wherein the second indication information indicates a third time-frequency resource, and an intersection set between the third time-frequency resource and the first time-frequency resource is a fourth time-frequency resource; and
  wherein the program includes instructions for determining a fifth time-frequency resource, wherein the fifth time-frequency resource comprises at least one resource element (RE), the at least one RE is comprised in the first time-frequency resource, and received signals on the fifth time-frequency resource comprise a first signal that is not used for the terminal device to decode the first transport block.

11. The terminal device according to claim 10, wherein the fifth time-frequency resource is the fourth time-frequency resource;
  the fifth time-frequency resource is an intersection set between the second time-frequency resource and the fourth time-frequency resource;
  when the second time-frequency resource has a smaller quantity of REs than the fourth time-frequency resource, the fifth time-frequency resource is the second time-frequency resource;
  when the fourth time-frequency resource has a smaller quantity of REs than the second time-frequency resource, the fifth time-frequency resource is the fourth time-frequency resource; or
  the fifth time-frequency resource comprises at least one resource corresponding to one CBG in the first CBG, wherein the at least one resource is a time-frequency resource that is in a time-frequency resource corresponding to the first CBG on the second time-frequency resource and a time-frequency resource corresponding to the first CBG on the fourth time-frequency resource and that has a smaller quantity of REs.

12. The terminal device according to claim 11, wherein the first indication information and the second indication information are sent within a same time segment in time domain, the same time segment comprises one or more time units, each time unit of the one or more time units is a frame, a subframe, a slot, a mini-slot, or a symbol, and the same time segment is:
  a period during which the terminal device monitors downlink control information;
  a period during which the terminal device monitors downlink control information used to schedule data transmission;
  a period during which the terminal device monitors the first indication information; or
  a period during which the terminal device monitors the second indication information.

13. The terminal device according to claim 10, wherein the first transport block comprises one code block, and the fifth time-frequency resource is the fourth time-frequency resource.

14. The terminal device according to claim 10, wherein:
  the first indication information precedes the second indication information in time domain, and the fifth time-frequency resource is the second time-frequency resource; or
  the second indication information precedes the first indication information in time domain, and the fifth time-frequency resource is the fourth time-frequency resource.

15. The terminal device according to claim 14, wherein the first indication information and the second indication information are sent within different time segments in time domain, or the first indication information and the second indication information are sent within a same time segment in time domain, wherein each time segment comprises one or more time units, each time unit of the one or more time units is one of a frame, a subframe, a slot, a mini-slot, or a symbol, and each time segment is:
  a period during which the terminal device monitors downlink control information;
  a period during which the terminal device monitors downlink control information used to schedule data transmission;
  a period during which the terminal device monitors the first indication information; or
  a period during which the terminal device monitors the second indication information.

16. The terminal device according to claim 10, wherein there is no intersection set between the second time-frequency resource and the fourth time-frequency resource, and the fifth time-frequency resource is the first time-frequency resource.

17. A network device, comprising:
  a transmitter, configured to:
    send, by the network device, first control information to a terminal device, wherein the first control information instructs the terminal device to receive, on a first time-frequency resource, a first transport block sent by the network device at an $n^{th}$ time, wherein n is an integer greater than o;

send, by the network device, the first transport block to the terminal device on the first time-frequency resource; and send, by the network device, first indication information to the terminal device, wherein the first indication information indicates a first code block group (CBG) in the first transport block, and the first CBG corresponds to a second time-frequency resource during $n^{th}$ transmission of the first transport block.

18. The network device according to claim 17, wherein the transmitter is further configured to:

send, by the network device, second indication information to the terminal device, wherein the second indication information indicates a third time-frequency resource, and an intersection set between the third time-frequency resource and the first time-frequency resource is a fourth time-frequency resource; and wherein the first indication information or the second indication information is used for the terminal device to determine a fifth time-frequency resource, wherein the fifth time-frequency resource comprises at least one resource element (RE), the at least one RE is comprised in the first time-frequency resource, and received signals on the fifth time-frequency resource comprise a first signal that is not used for the terminal device to decode the first transport block.

19. The network device according to claim 18, wherein:

the fifth time-frequency resource is the fourth time-frequency resource;

the fifth time-frequency resource is an intersection set between the second time-frequency resource and the fourth time-frequency resource;

when the second time-frequency resource has a smaller quantity of REs than the fourth time-frequency resource, the fifth time-frequency resource is the second time-frequency resource;

when the fourth time-frequency resource has a smaller quantity of REs than the second time-frequency resource, the fifth time-frequency resource is the fourth time-frequency resource; or the fifth time-frequency resource comprises at least one resource corresponding to one CBG in the first CBG, wherein the resource is a time-frequency resource that is in a time-frequency resource corresponding to the CBG on the second time-frequency resource and a time-frequency resource corresponding to the CBG on the fourth time-frequency resource and that has a smaller quantity of REs.

20. The network device according to claim 19, wherein the first indication information and the second indication information are sent within a same time segment in time domain, the same time segment comprises one or more time units, each time unit of the one or more times units is a frame, a subframe, a slot, a mini-slot, or a symbol, and the same time segment is:

a period during which the terminal device monitors downlink control information;

a period during which the terminal device monitors downlink control information used to schedule data transmission;

a period during which the terminal device monitors the first indication information; or a period during which the terminal device monitors the second indication information.

* * * * *